US011459011B2

(12) United States Patent
Stoxen et al.

(10) Patent No.: US 11,459,011 B2
(45) Date of Patent: Oct. 4, 2022

(54) SNOW SKI ASSEMBLY FOR SNOW VEHICLE

(71) Applicant: YAMAHA HATSUDOKI KABUSHIKI KAISHA, Shizuoka (JP)

(72) Inventors: Jeffrey Lee Stoxen, Rhinelander, WI (US); Gregory James Schulze, Arbor Vitae, WI (US); James Christopher Vizanko, Arbor Vitae, WI (US); Hiroyuki Okada, Minocqua, WI (US)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 359 days.

(21) Appl. No.: 16/776,100

(22) Filed: Jan. 29, 2020

(65) Prior Publication Data

US 2021/0229731 A1   Jul. 29, 2021

(51) Int. Cl.
*B62B 17/02*        (2006.01)
*B62M 27/02*        (2006.01)

(52) U.S. Cl.
CPC ............. *B62B 17/02* (2013.01); *B62M 27/02* (2013.01); *B62M 2027/025* (2013.01)

(58) Field of Classification Search
CPC .. B62B 17/02; B62M 27/02; B62M 2027/025
See application file for complete search history.

(56) References Cited

U.S. PATENT DOCUMENTS

| | | | |
|---|---|---|---|
| 3,866,933 A * | 2/1975 | Mollring | B62B 13/08 180/182 |
| 3,931,862 A | 1/1976 | Cote | |
| 3,967,692 A * | 7/1976 | Hoffman | B62B 13/08 244/108 |
| 4,328,878 A | 5/1982 | Yoshida | |
| 4,591,173 A * | 5/1986 | Maher | B62B 17/04 280/21.1 |
| 4,593,921 A | 6/1986 | Marier | |

(Continued)

FOREIGN PATENT DOCUMENTS

| | | |
|---|---|---|
| JP | S6177584 A | 4/1986 |
| JP | S6341790 B2 | 8/1988 |
| JP | 2003200831 A | 7/2003 |

*Primary Examiner* — Jacob B Meyer
(74) *Attorney, Agent, or Firm* — Global IP Counselors, LLP

(57) ABSTRACT

A snow ski assembly for a snow vehicle includes a ski body, a ski spindle, a ski stopper and a ski keel pressure adjuster. The ski body has an upper surface with a ski spindle attachment and a bottom surface with a keel. The ski spindle has a lower end pivotally connected to the ski spindle attachment of the ski body about a pivot axis. The ski stopper is disposed between the upper surface of the ski body and the lower end of the ski spindle. The ski keel pressure adjuster includes at least one adjustment member and at least one user input. The at least one adjustment member is movably disposed with respect to the ski body between a first position in which the ski stopper has a first compression characteristic and a second position in which the ski stopper has a second compression characteristic. The at least one user input is operatively coupled to the at least one adjustment member to move the at least one adjustment member in response to operation of the at least one user input.

16 Claims, 32 Drawing Sheets

(56) References Cited

U.S. PATENT DOCUMENTS

| | | | |
|---|---|---|---|
| 4,826,185 A | 5/1989 | Blanchard et al. | |
| 6,086,101 A * | 7/2000 | Cormican | A63C 5/075 |
| | | | 280/809 |
| 6,185,920 B1 | 2/2001 | Oxley | |
| 6,199,649 B1 * | 3/2001 | Alanko | B62B 17/04 |
| | | | 180/186 |
| 6,955,237 B1 * | 10/2005 | Przekwas | B62M 27/02 |
| | | | 280/601 |
| 6,971,653 B2 | 12/2005 | Takahiko | |
| 7,243,927 B2 | 7/2007 | Takahiko | |
| 7,374,188 B2 * | 5/2008 | Hibbert | B62M 27/02 |
| | | | 280/124.128 |
| 7,413,197 B2 | 8/2008 | Haruna et al. | |
| 7,413,198 B2 * | 8/2008 | Lemieux | B62B 17/02 |
| | | | 280/21.1 |
| 9,428,232 B2 | 8/2016 | Ripley et al. | |
| 9,956,982 B1 * | 5/2018 | Gagnon | B62M 27/02 |
| 10,059,362 B1 * | 8/2018 | Robillard | B62B 17/02 |
| 10,322,772 B1 * | 6/2019 | Aberle | B62M 27/02 |
| 10,668,986 B2 * | 6/2020 | Bergstrom | B62M 27/02 |
| 11,198,486 B2 * | 12/2021 | Labbe | B62M 27/02 |
| 2002/0109315 A1 * | 8/2002 | Cormican | B62B 17/02 |
| | | | 280/22 |
| 2003/0019676 A1 * | 1/2003 | Mallette | B62M 27/02 |
| | | | 180/190 |
| 2003/0151216 A1 * | 8/2003 | Takahiko | B62M 27/02 |
| | | | 280/28 |
| 2003/0189302 A1 | 10/2003 | Makitalo | |
| 2011/0089649 A1 * | 4/2011 | Wrightman | B62B 17/02 |
| | | | 29/401.1 |
| 2015/0314800 A1 * | 11/2015 | Laurence | B62B 17/02 |
| | | | 280/28 |
| 2021/0229731 A1 * | 7/2021 | Stoxen | B62M 27/02 |

* cited by examiner

SNOW SKI ASSEMBLY FOR SNOW VEHICLE

BACKGROUND

Technical Field

The present invention generally relates to a snow ski assembly for a snow vehicle. More specifically, the present invention relates to a snow ski assembly for a snow vehicle in which a ski keel pressure is adjustable.

Background Information

Generally, snow vehicles such as snowmobiles and snow bikes are land vehicles that are used for transportation, recreation, or utility in cold and snowy conditions. Typically, a snow vehicle is adapted to travel across snow and/or ice, and usually includes a vehicle body supported by a track belt unit with an endless track belt and at least one steerable snow ski positioned in a forward direction of the track belt unit. The vehicle body has a saddle seat, an engine that drives the endless track belt, and a handlebar that is coupled to the skis. A rider can turn the handlebar to steer the skis to the left and right. In the case of a snowmobile, a pair of skis serve to facilitate steering as well as to provide floatation of the front of the snowmobile over the snow in which it is operated.

Typically, snow vehicle skis are constructed having a plate-like ski body, which is formed integrally with a keel that protrudes from the bottom of the ski body toward the snow surface. This construction generally is superior to a completely flat ski. However, the desired construction of the ski body and the keel vary depending on the average snow conditions and/or the average load expected to be carried by the snowmobile. While a snow vehicle skis produced as described above will perform reasonably well under average load and snow conditions, a specific snow vehicle will seldom be operated in such conditions.

Snow conditions can vary through the winter season and in some cases can even vary throughout a single day. For example, the snow conditions can be an icy snow, a hard-pack snow, a soft/melting snow, a fluffy powder snow, etc. Also, while certain snow conditions may be typical, a particular locality might receive vastly greater amounts of snowfall (e.g., an area subject to lake-effect snow) or may have very little snow and a great deal of ice. Also, for example, the load may be significantly smaller (e.g., a young adult) or larger (e.g., a heavy man, two passengers, or pulling a large load) than the average expected load. In other words, the snow conditions and load may vary to a great extent depending on how and where the snow vehicle is being operated. Also, drivers can have different riding styles and/or handling preferences. As a result, a snow vehicle with such skis will seldom perform as well as it could were the configuration of the skis better matched to the load and snow conditions as well as the driver's riding style and/or handling preference.

SUMMARY

A need therefore exists for an improved steering ski for a snow vehicle. The ski preferably improves handling in a wide variety operating conditions, e.g., snow and load-bearing conditions. More preferably, the ski provides a keel design that is adaptable to the prevailing operating conditions. Generally, the present disclosure is directed to various features of a snow ski assembly for a snow vehicle in which a ski keel pressure is adjustable.

In view of the state of the known technology and in accordance with one aspect of the present disclosure, a snow ski assembly is provided for a snow vehicle in which the snow ski assembly basically comprises a ski body, a ski spindle, a ski stopper and a ski keel pressure adjuster. The ski body has an upper surface with a ski spindle attachment and a bottom surface with a keel. The ski spindle has a lower end pivotally connected to the ski spindle attachment of the ski body about a pivot axis. The ski stopper is disposed between the upper surface of the ski body and the lower end of the ski spindle. The ski keel pressure adjuster includes at least one adjustment member and at least one user input. The at least one adjustment member is movably disposed with respect to the ski body between a first position in which the ski stopper has a first compression characteristic and a second position in which the ski stopper has a second compression characteristic. The at least one user input is operatively coupled to the at least one adjustment member to move the at least one adjustment member in response to operation of the at least one user input.

In accordance with another aspect of the present disclosure, a snow ski assembly is provided for a snow vehicle in which the snow ski assembly basically comprises a ski body, a ski spindle, a ski stopper and a ski keel pressure adjuster. The ski body has an upper surface with a ski spindle attachment and a bottom surface with a keel. The ski spindle has a lower end pivotally connected to the ski spindle attachment of the ski body about a pivot axis. The ski stopper is disposed between the upper surface of the ski body and the lower end of the ski spindle. The ski keel pressure adjuster includes at least one adjustment member movably disposed with respect to the ski stopper between at least two positions and at least one user input operatively coupled to the at least one adjustment member to selectively establish the at least two positions without detaching the ski body from the ski spindle.

In accordance with yet another aspect of the present disclosure, a snow ski assembly is provided for a snow vehicle in which the snow ski assembly basically comprises a ski body, a ski spindle, a ski stopper and adjusting means. The ski body has an upper surface with a ski spindle attachment and a bottom surface with a keel. The ski spindle has a lower end pivotally connected to the ski spindle attachment of the ski body about a pivot axis. The ski stopper is disposed between the upper surface of the ski body and the lower end of the ski spindle. The adjusting means changes a ski keel pressure without detaching the ski body from the ski spindle.

With the snow ski assembly according to these aspects, it is possible to easily adjust a ski keel pressure without having to remove the ski from the snow vehicle.

Also, other objects, features, aspects and advantages of the disclosed snow ski assembly will become apparent to those skilled in the snow vehicle field from the following detailed description, which, taken in conjunction with the annexed drawings, discloses preferred embodiments of the snow vehicle.

BRIEF DESCRIPTION OF THE DRAWINGS

Referring now to the attached drawings which form a part of this original disclosure, a snow vehicle will now be described with reference to drawings that show presently preferred arrangements that are intended to illustrate and not to limit the present invention.

Figure 1:
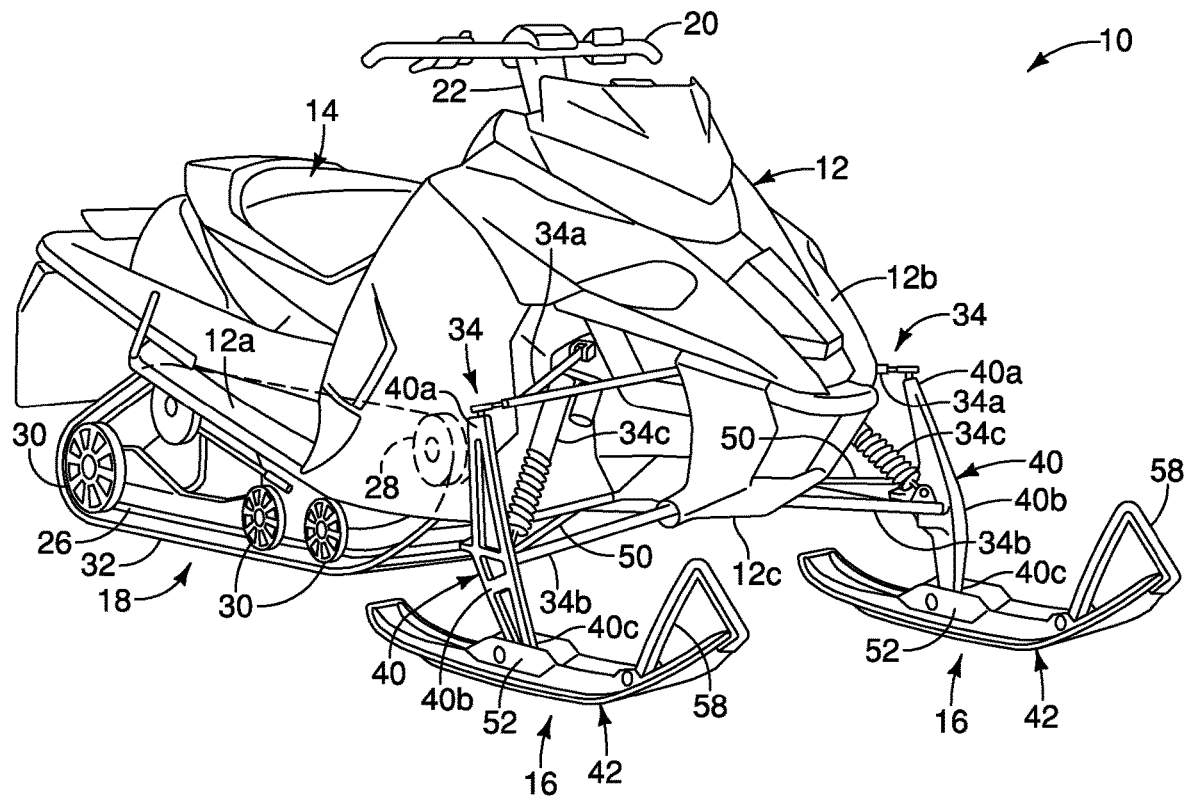
FIG. 1 is a perspective view of a snowmobile (a snow vehicle) having a pair of snow ski assemblies in accordance with a first embodiment.

It should be noted that these figures are intended to illustrate the general characteristics of methods, structure and/or materials utilized in certain illustrative embodiment and to supplement the written description provided below. These figures are to reduce scale of the actual snowmobile but may not precisely reflect the precise structural or performance characteristics of any given embodiment. However, the dimensional relationships and the arrangement of the parts of the snowmobile are accurately depicted.

DETAILED DESCRIPTION OF EMBODIMENTS

Selected embodiments will now be explained with reference to the drawings. It will be apparent to those skilled in the snow vehicle field from this disclosure that the following descriptions of the embodiments are provided for illustration only and not for the purpose of limiting the invention as defined by the appended claims and their equivalents. Like reference numerals in the drawings denote like similar or identical elements or features, and thus the descriptions of the similar or identical elements or features may be omitted in later embodiments.

Referring initially to FIG. 1, a snowmobile 10 is illustrated that is configured in accordance with the illustrative embodiments. While described in the context of a snowmobile, it should be readily appreciated that the present invention also can be used in a variety of other applications, such as snow vehicles having at least one ski such as snow bikes for instance. The snowmobile 10 is a saddle-riding type vehicle that basically includes a vehicle body 12, a saddle seat 14, a pair of snow ski assemblies 16 and a track propulsion unit 18. The snow ski assemblies 16 are supported by a front section of the vehicle body 12, which can also be referred to as a snowmobile body. The snow ski assemblies 16 are turnable in conventional manner by a handlebar 20 that is attached to an upper end of a steering column 22.

The vehicle body 12 is made up of a number of parts, which can be formed from suitable materials. In the illustrated embodiment, the vehicle body 12 includes, among other parts, a frame 12a, an upper engine shroud 12b, and a lower tray or hull 12c. The upper engine shroud 12b and the lower tray 12c are connected to the frame 12a. Together the upper engine shroud 12b and the lower tray 12c define an engine compartment that preferably houses an internal combustion engine (not shown) or electric motor (not shown) for powering the snowmobile 10. The saddle seat 14 is provided on a rear section of the frame 12a for one or more riders to seat on in a straddle fashion.

The track propulsion unit 18 is supported at the rear section of the frame 12a of the vehicle body 12 beneath the saddle seat 14. The track propulsion unit 18 includes a pair of guide rails 26 (only one shown), at least one driving wheel 28 (only one shown), a plurality of driven wheels 30 and a track belt 32. The track belt 32 is wound around the driving wheels 28 and the driven wheels 30. The driving wheels 28 are rotated by driving power supplied from the internal combustion engine or electric motor for via a continuously variable transmission in conventional manner. The driven wheels 30 are driven with a circulatory rotation of the track belt 32.

Now, the snow ski assemblies 16 will be discussed in more detail. As seen in FIG. 1, the snow ski assemblies 16 are supported at a forward section of the vehicle body 12. In particular, each of the snow ski assemblies 16 is supported at a forward section of the vehicle body 12 through a front suspension 34 so that left and right snow ski assemblies 16 are each suspended independently. Basically, the left and right front suspensions 34 include an upper A-arm 34a, a lower A-arm 34b and a shock absorber 34c. The outer ends of each of the A-arms 34a and 34b is connected to the snow ski assemblies 16 and the inner ends of each of the A-arms 34a and 34b are connected to the vehicle body 12. Each of the shock absorbers 34c is mounted between the vehicle body 12 and the lower A-arm 34b. Since front suspensions, such as the front suspensions 34, are well known and conventional, the front suspensions 34 will not be discussed in further detail herein.

Figure 2:
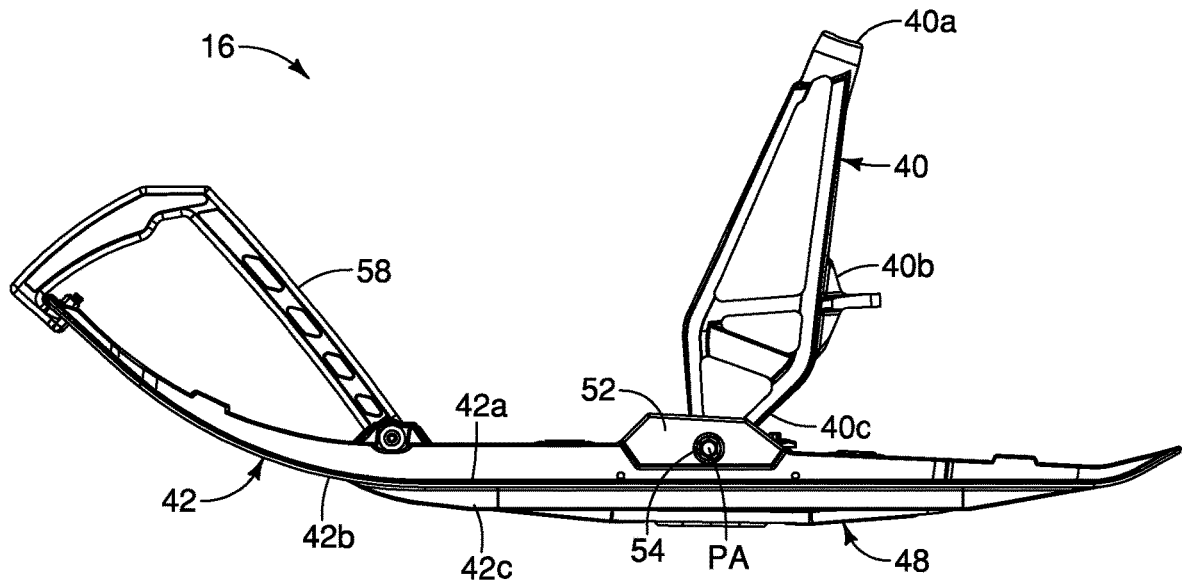
FIG. 2 is a side elevational view of the right side snow ski assembly of the snowmobile illustrated in FIG. 1.
Figure 3:
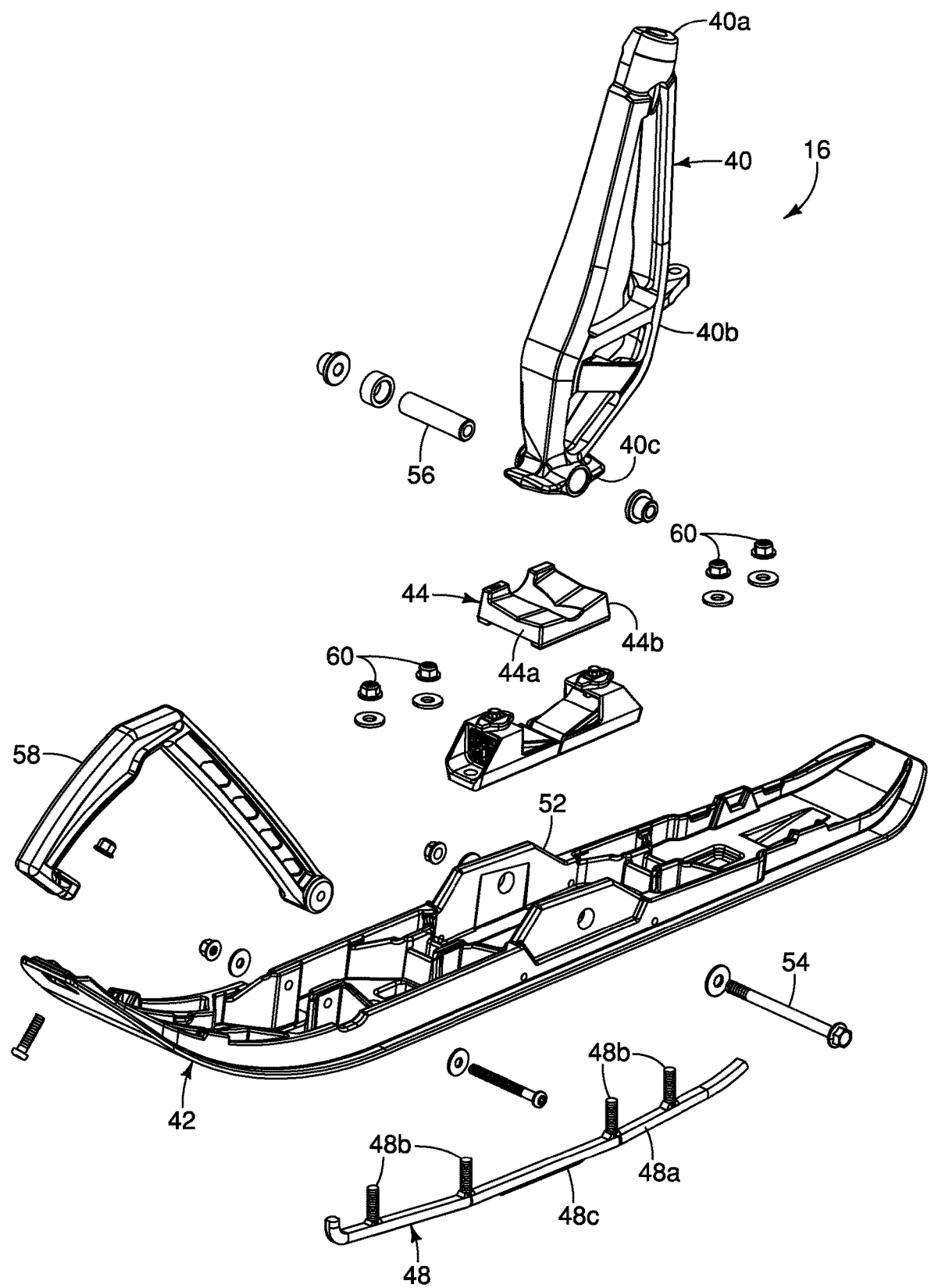
FIG. 3 is an exploded perspective view of the snow ski assembly illustrated in FIGS. 1 and 2.

The left and right snow ski assemblies 16 are symmetric in which some or all of the parts can be identical, and thus, the same reference symbols will be used to describe both of the snow ski assemblies 16. Basically, as seen in FIGS. 2 and 3, each of the snow ski assemblies 16 (only one shown) includes a ski spindle 40, a ski body 42, a ski stopper 44 and a runner or wear bar 48. The ski spindle 40 can be formed of any material of sufficient strength to provide secured coupling of the ski body 42 to the vehicle body 12, for example, steel. As seen in FIG. 1, the ski spindle 40 has an upper end 40a pivotally connected to the upper A-arm 34a, a middle section 40b pivotally connected to the lower A-arm 34b, and a lower end 40c that is pivotally connected to the ski body 42. A tie rod 50 has an inner end operatively coupled to the steering column 22 and an outer end pivotally coupled to the middle section 40b of the ski spindle 40 for turning the snow ski assembly 16 in response to turning the handlebar 20.

Figure 4:
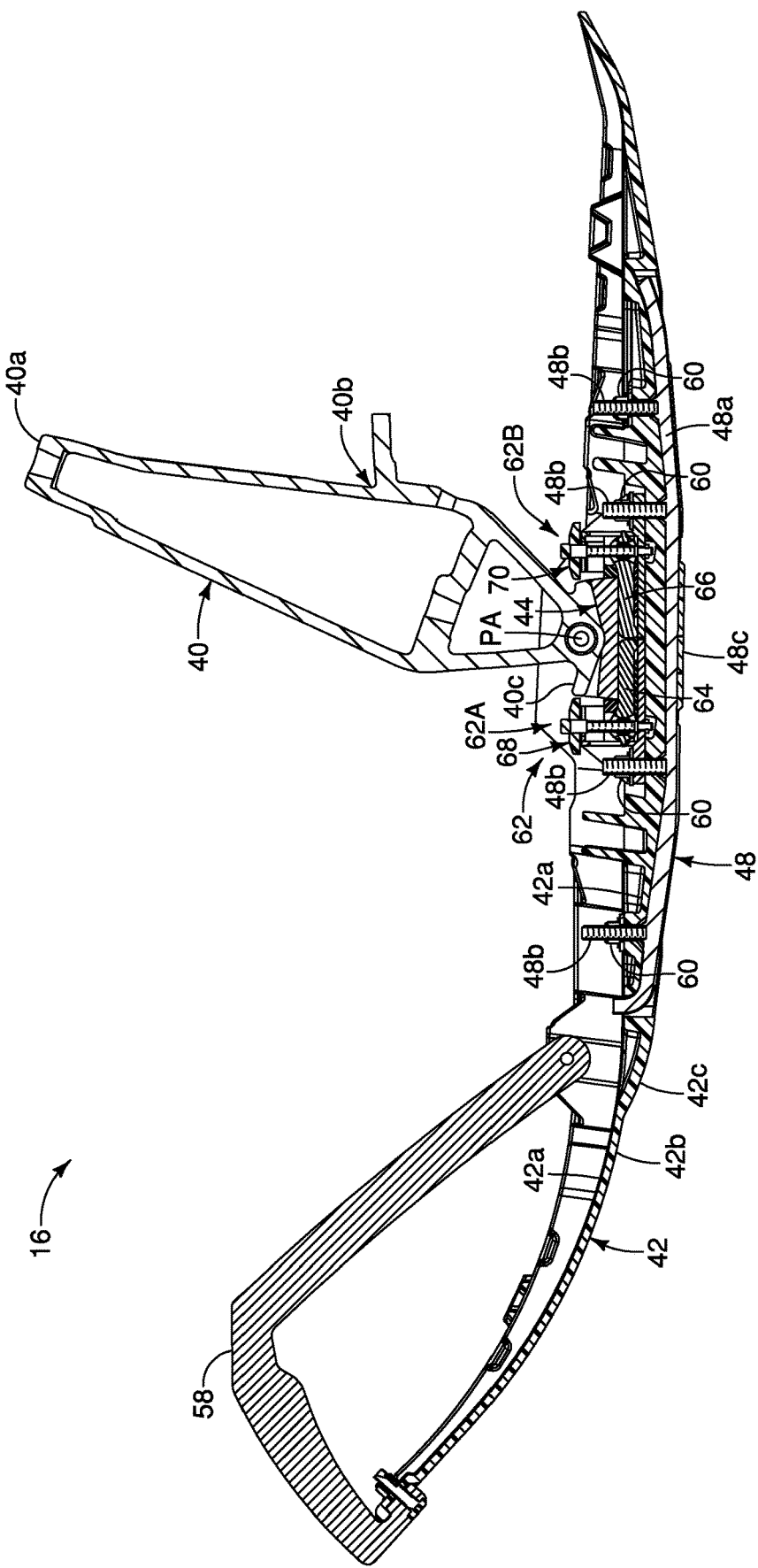
FIG. 4 is a longitudinal cross-sectional view of the snow ski assembly illustrated in FIG. 2 taken along the center plane that is perpendicular to the pivot axis between the ski body and the ski spindle.
Figure 5:
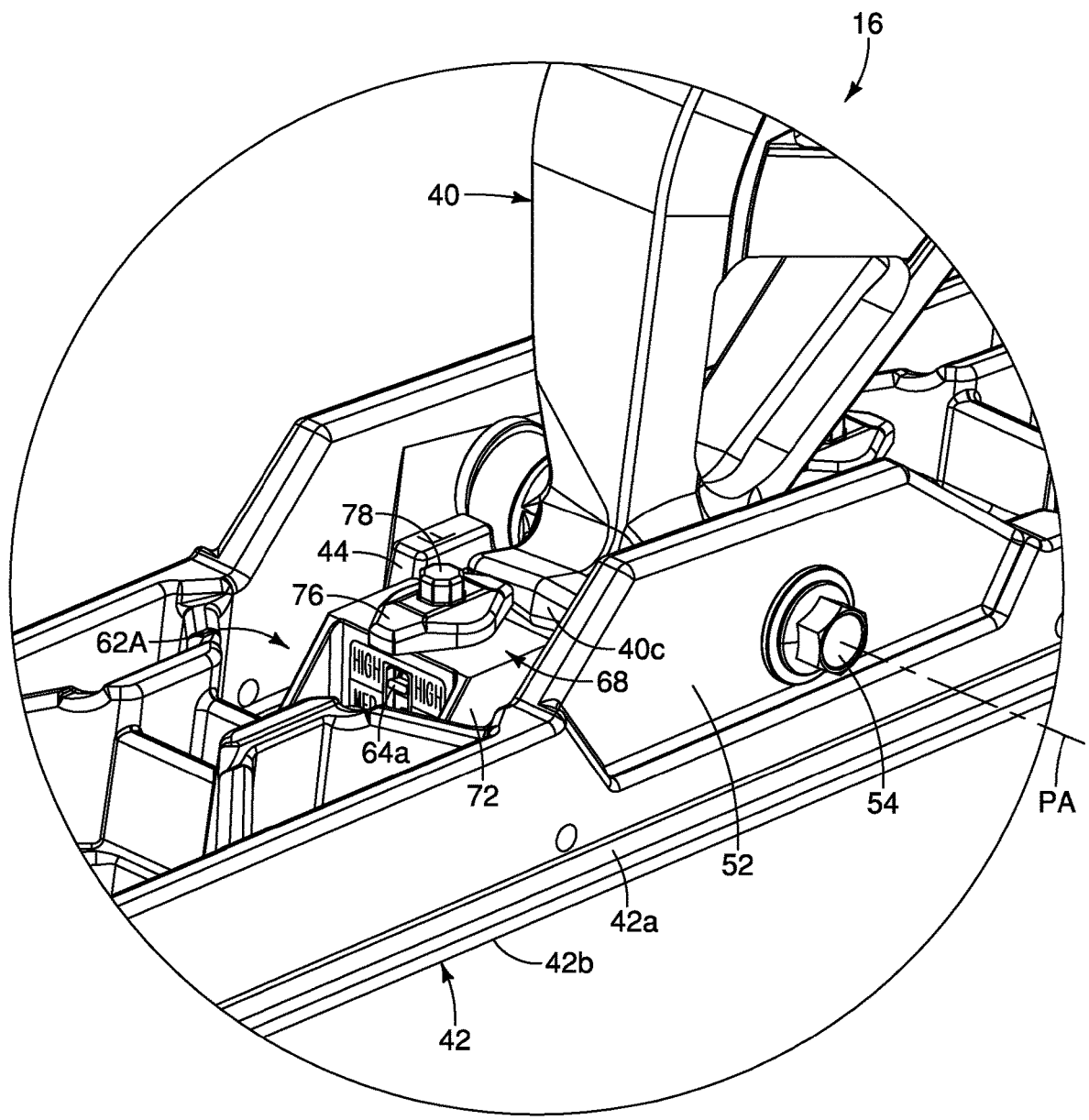
FIG. 5 is an enlarged perspective view of a portion of the snow ski assembly illustrated in FIGS. 2 and 3 as viewed from a front side of the ski spindle.
Figure 6:
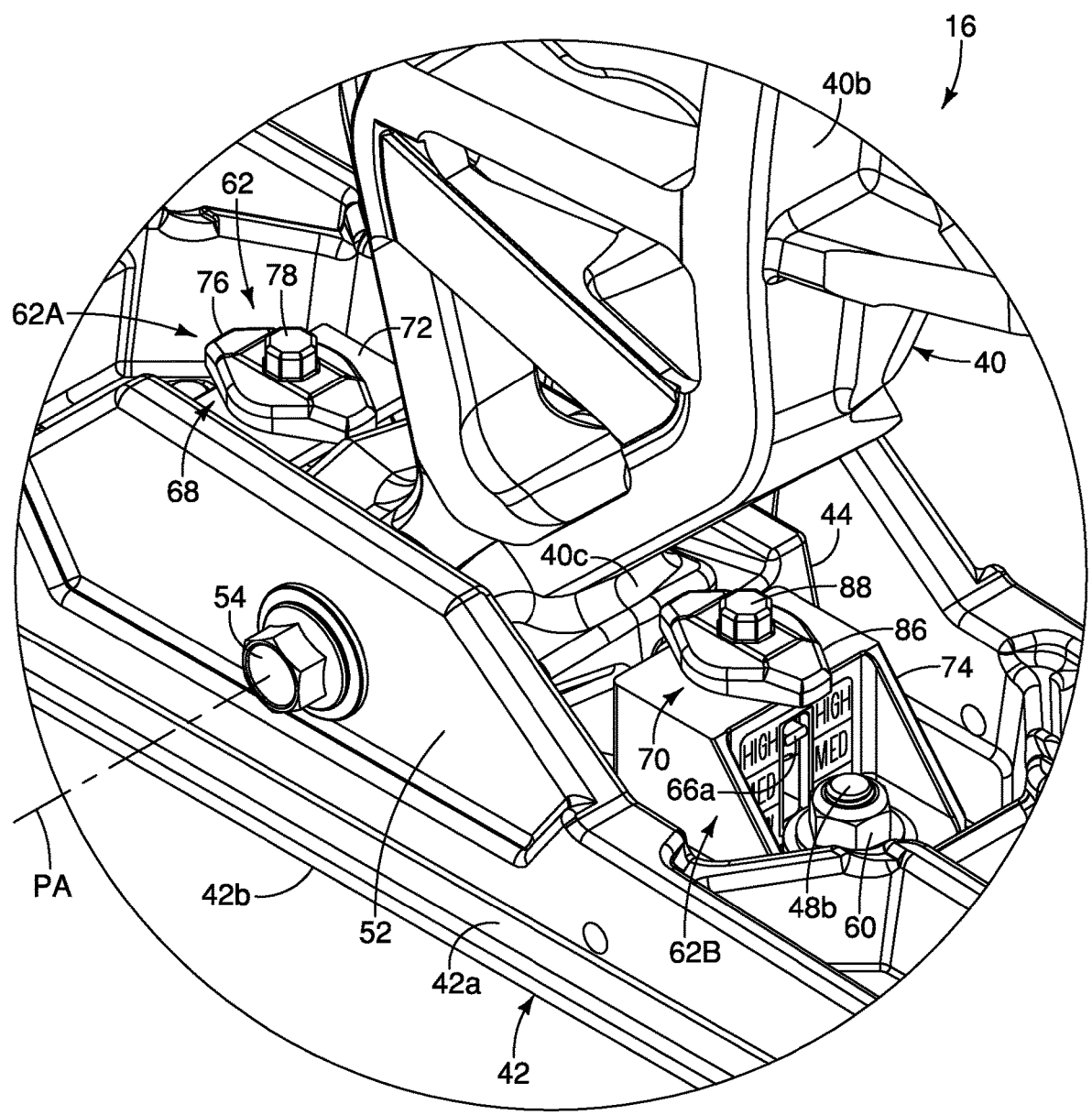
FIG. 6 is an enlarged perspective view of a portion of the snow ski assembly illustrated in FIGS. 2 and 3 to as viewed from a rear side of the ski spindle.
Figure 7:
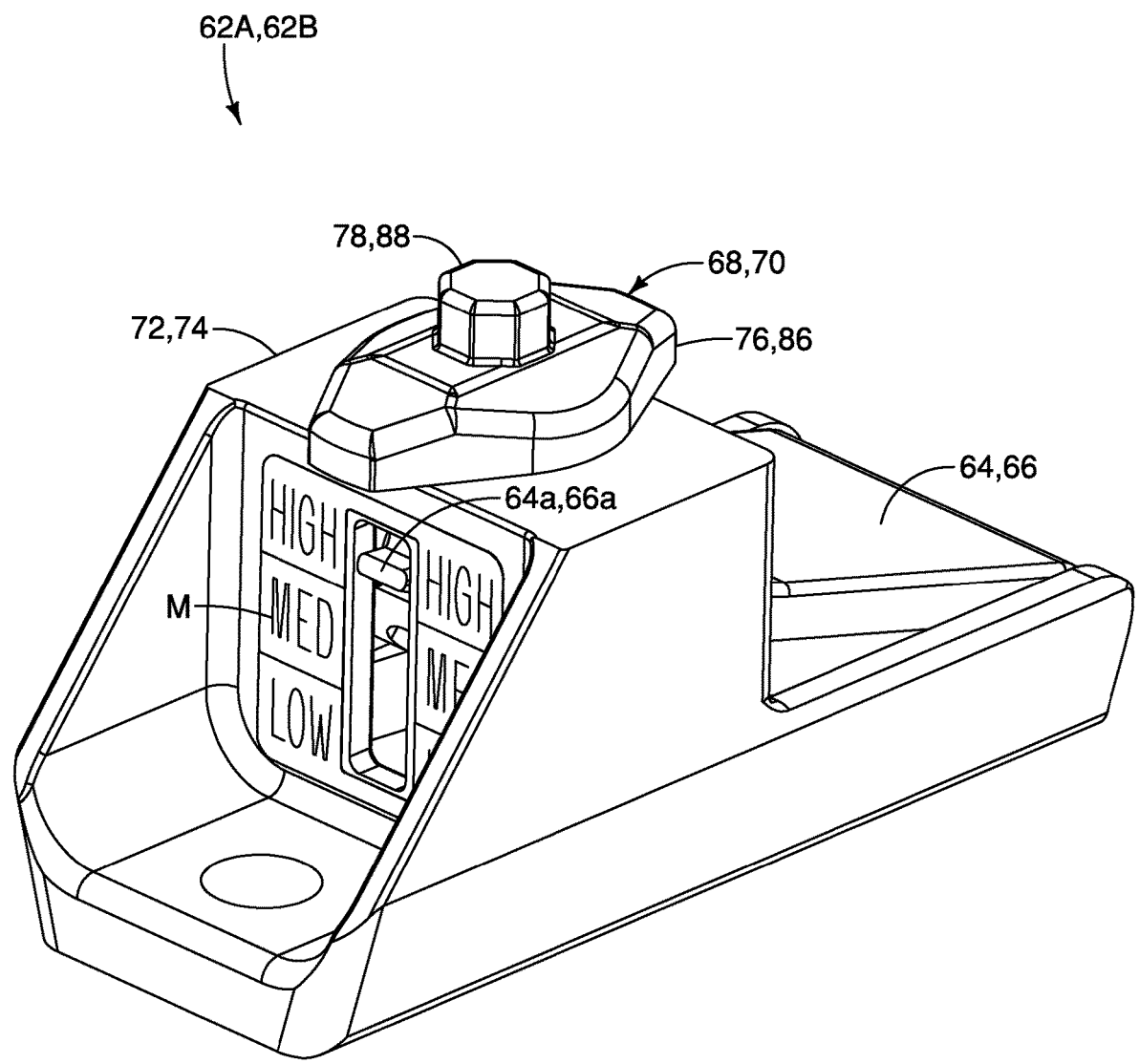
FIG. 7 is an enlarged perspective view of one of the adjustment member of the ski keel pressure adjuster for the snow ski assembly illustrated in FIGS. 2 and 3.
Figure 8:
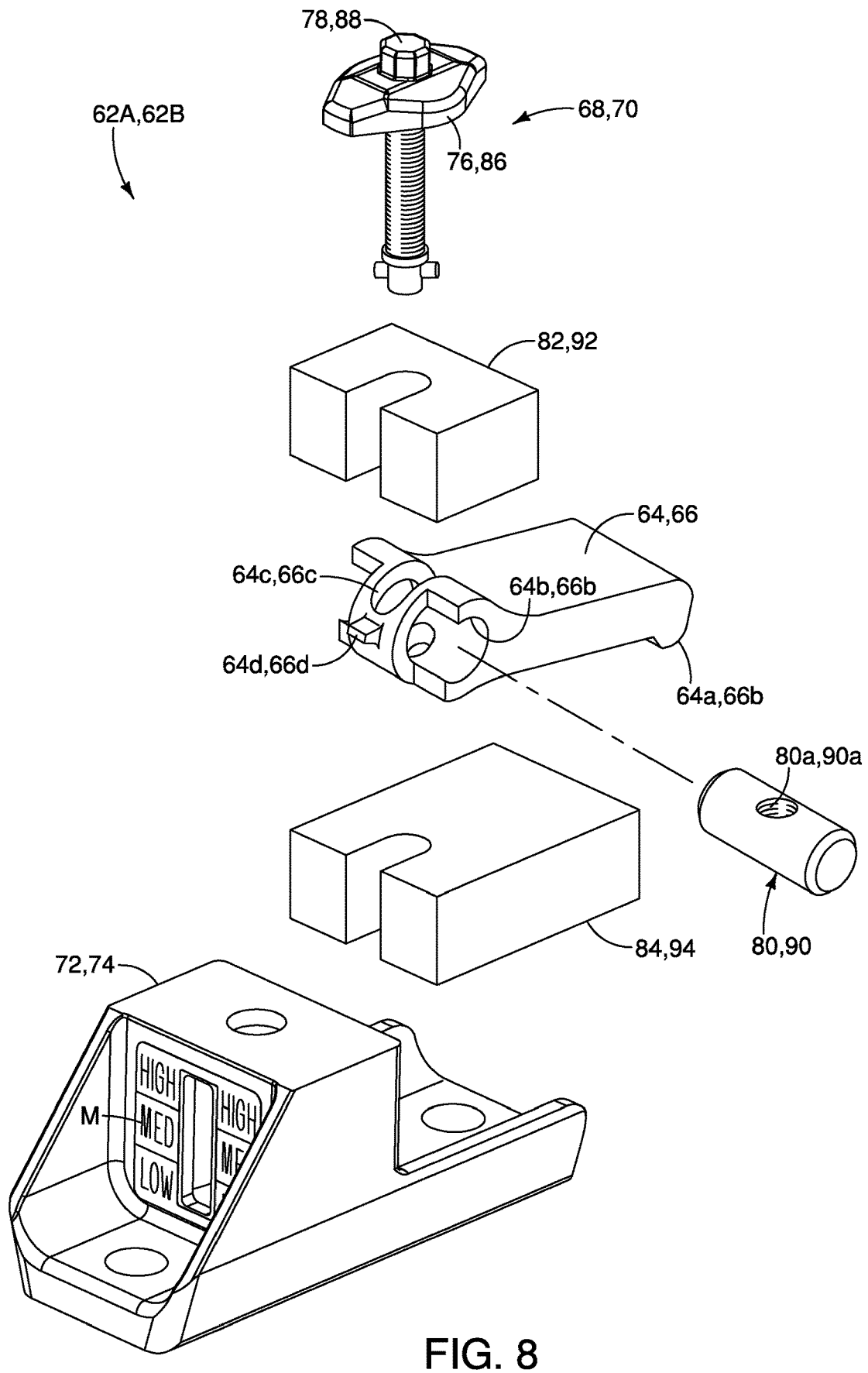
FIG. 8 is an exploded perspective view of the adjustment member illustrated in FIG. 7.

As best seen in FIGS. 2 and 4, the ski body 42 has an upper surface 42a and a bottom surface 42b having a keel 42c. A ski spindle attachment 52 is provided on the upper surface 42a of the ski body 42. The wear bar 48 is provided on the bottom surface 42b of the ski body 42. The lower end 40c of the ski spindle 40 is pivotally connected to the ski spindle attachment 52 of the ski body 42 about a pivot axis PA. In particular, the lower end 40c of the ski spindle 40 is pivotally connected to the ski spindle attachment 52 of the ski body 42 by a ski bolt 54 that is provided with a sleeve 56. In this way, the ski body 42 can pivot or rock relative to the ski spindle 40 about the pivot axis PA.

Figure 9:
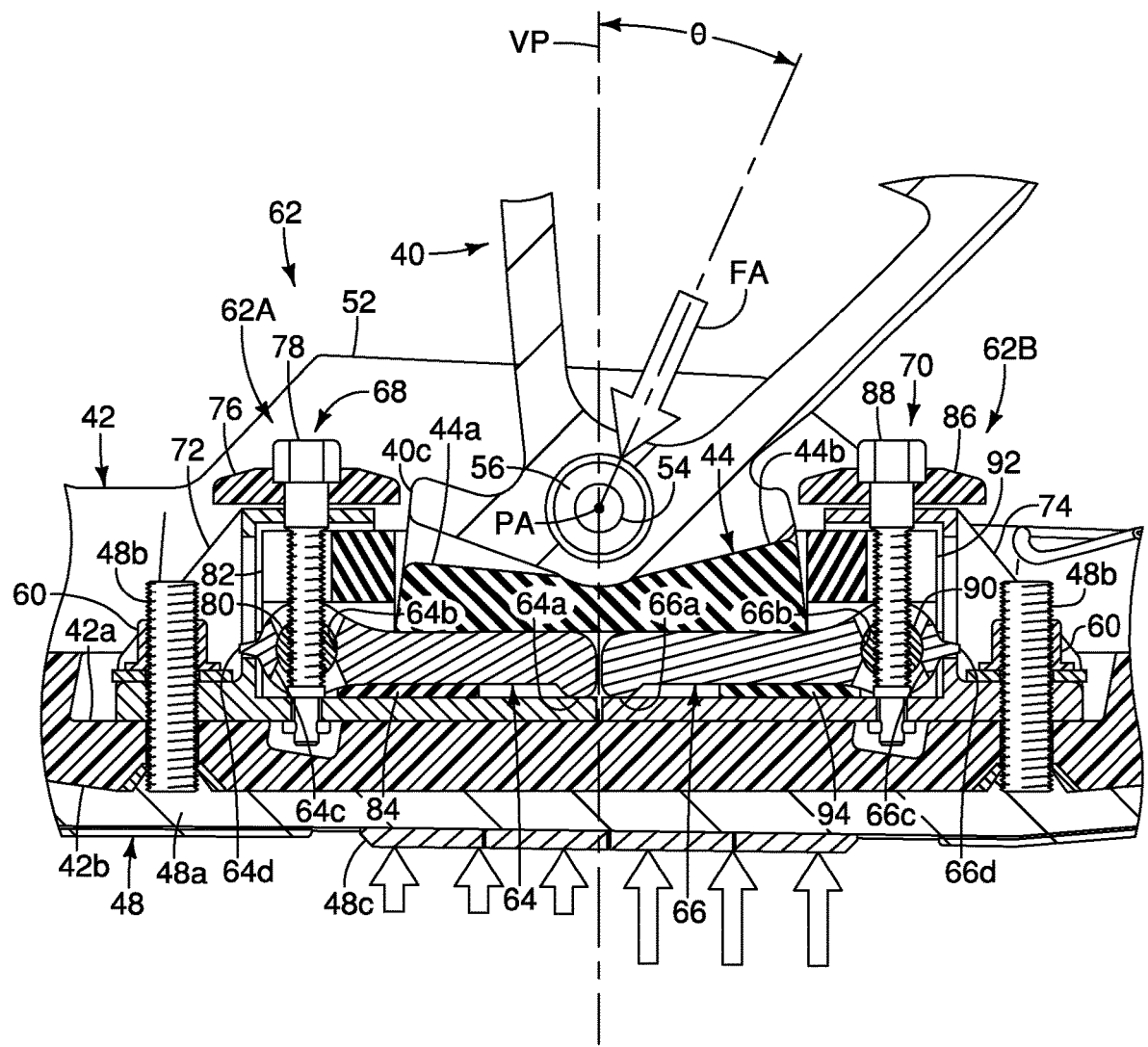
FIG. 9 is an enlarged cross-sectional view of a portion of the snow ski assembly illustrated in FIG. 3 in which the adjustment members are set so that the ski stopper has the lowest compression characteristic.
Figure 10:
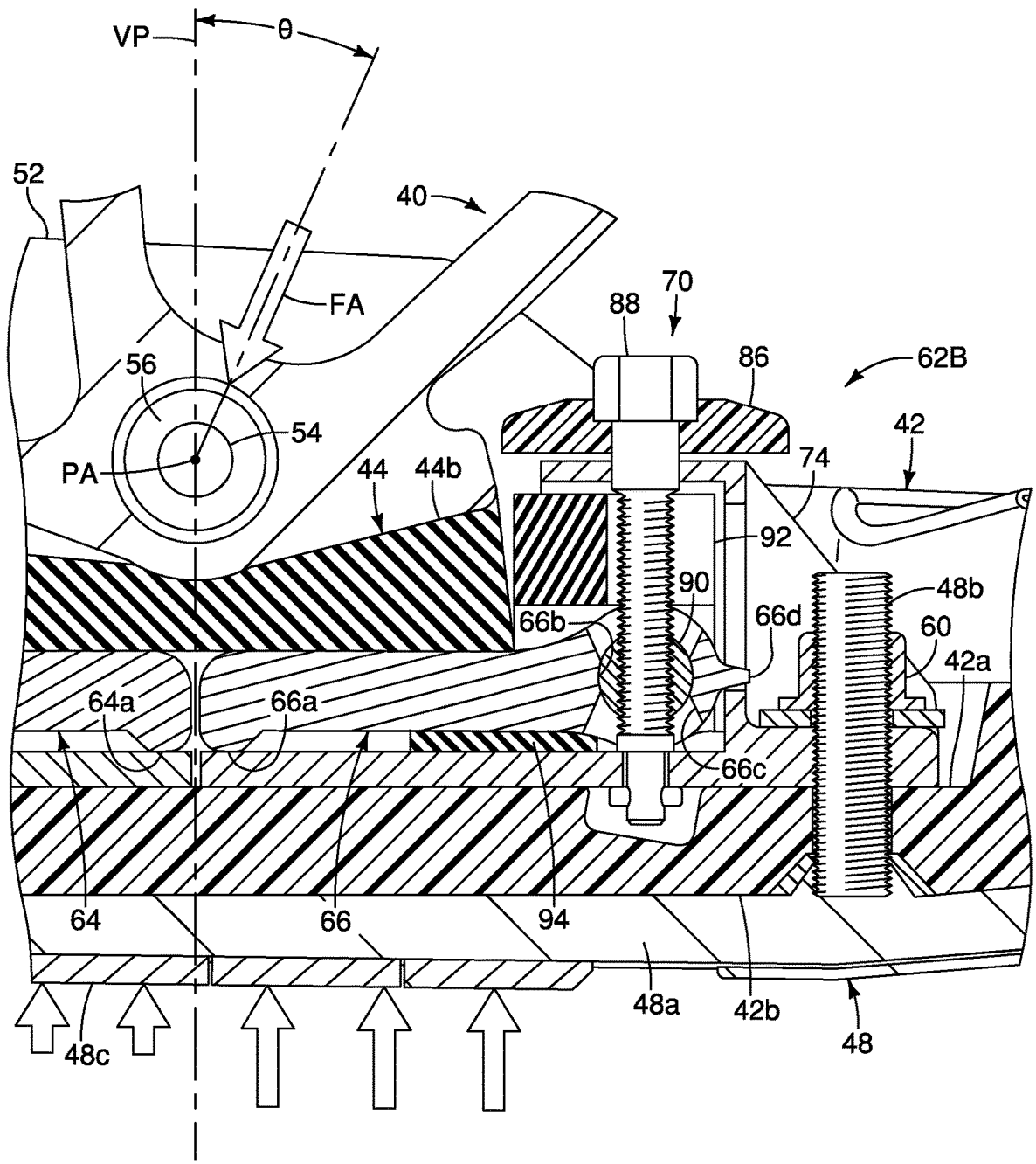
FIG. 10 is a further enlarged cross-sectional view of a portion of the snow ski assembly illustrated in FIG. 3 in which the adjustment members are set so that the ski stopper has the lowest compression characteristic.
Figure 11:
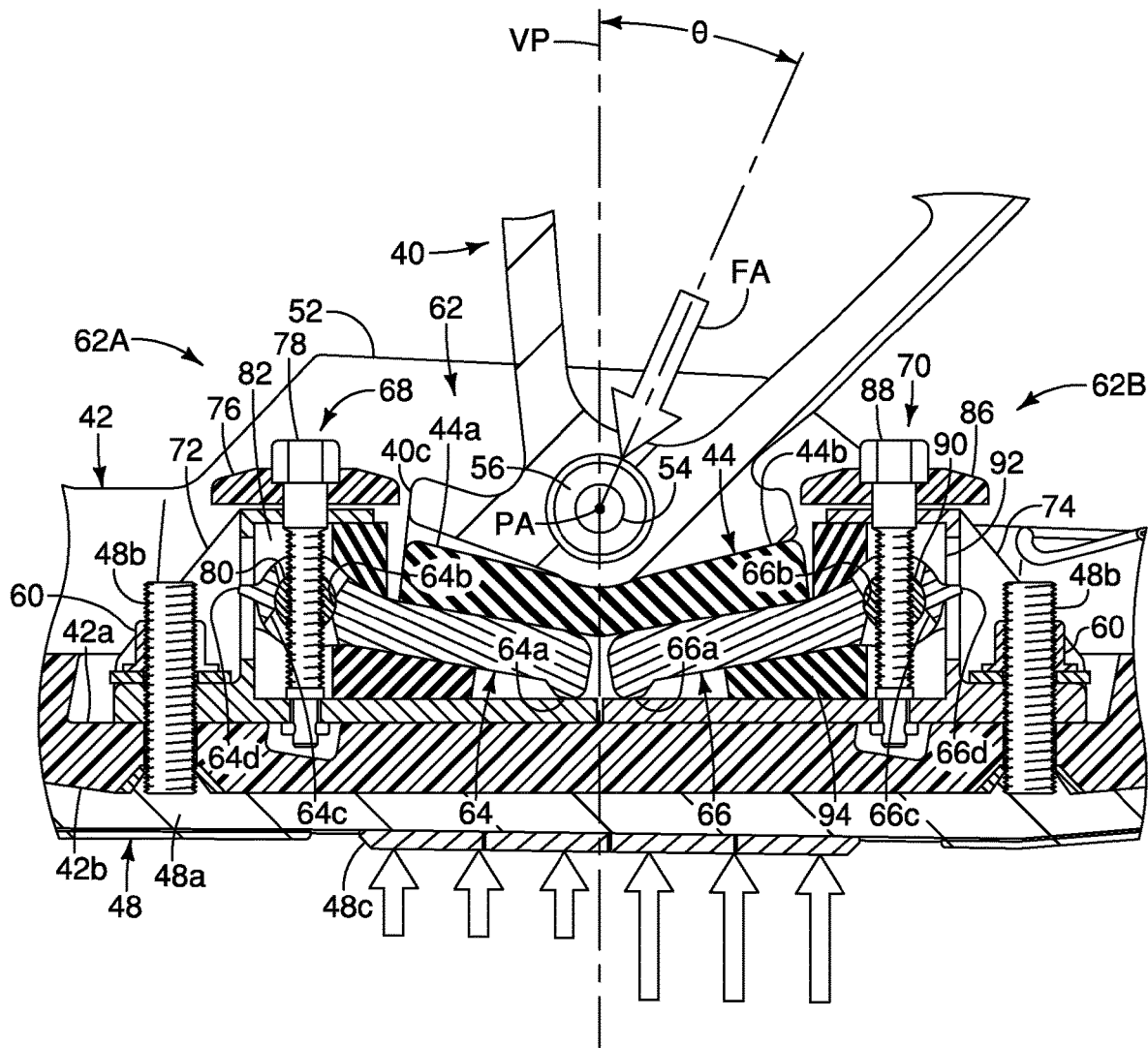
FIG. 11 is an enlarged cross-sectional view of a portion of the snow ski assembly illustrated in FIG. 3 but in which the adjustment members are set so that the ski stopper has the middle compression characteristic.
Figure 12:
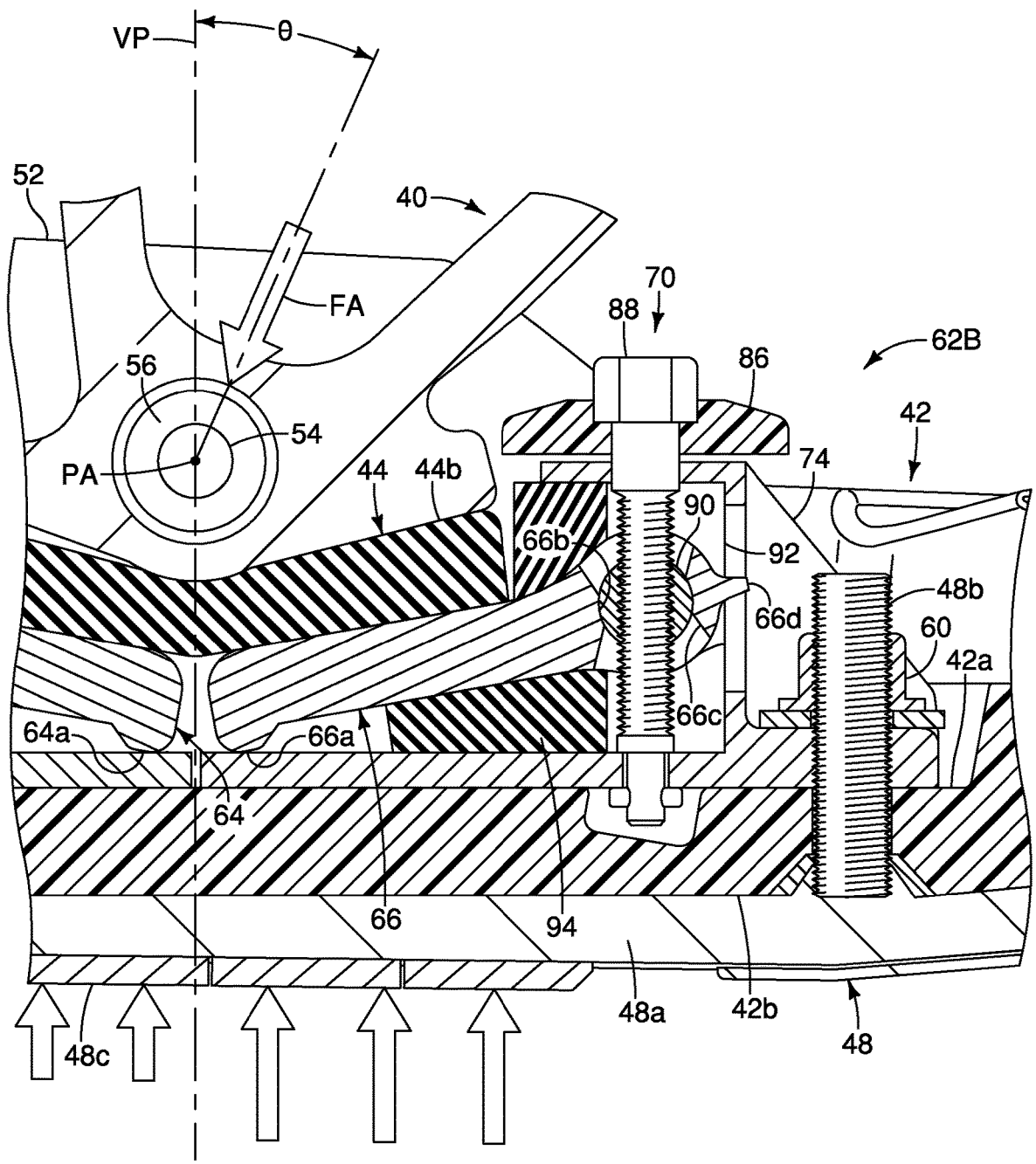
FIG. 12 is a further enlarged cross-sectional view of a portion of the snow ski assembly illustrated in FIG. 3 but in which the adjustment members are set so that the ski stopper has the middle compression characteristic.
Figure 13:
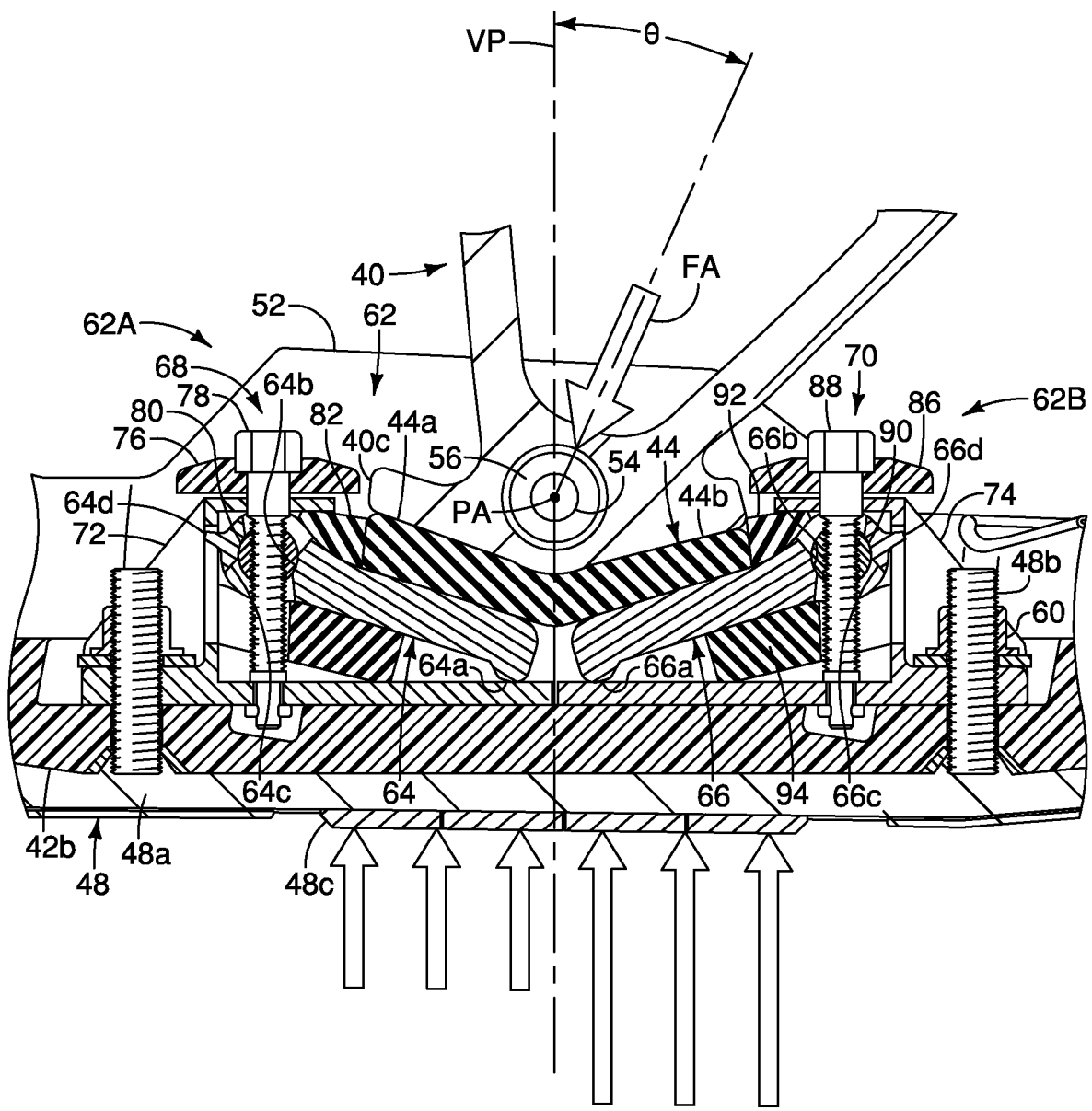
FIG. 13 is an enlarged cross-sectional view of a portion of the snow ski assembly illustrated in FIG. 3 but in which the adjustment members are set so that the ski stopper has the highest compression characteristic.
Figure 14:
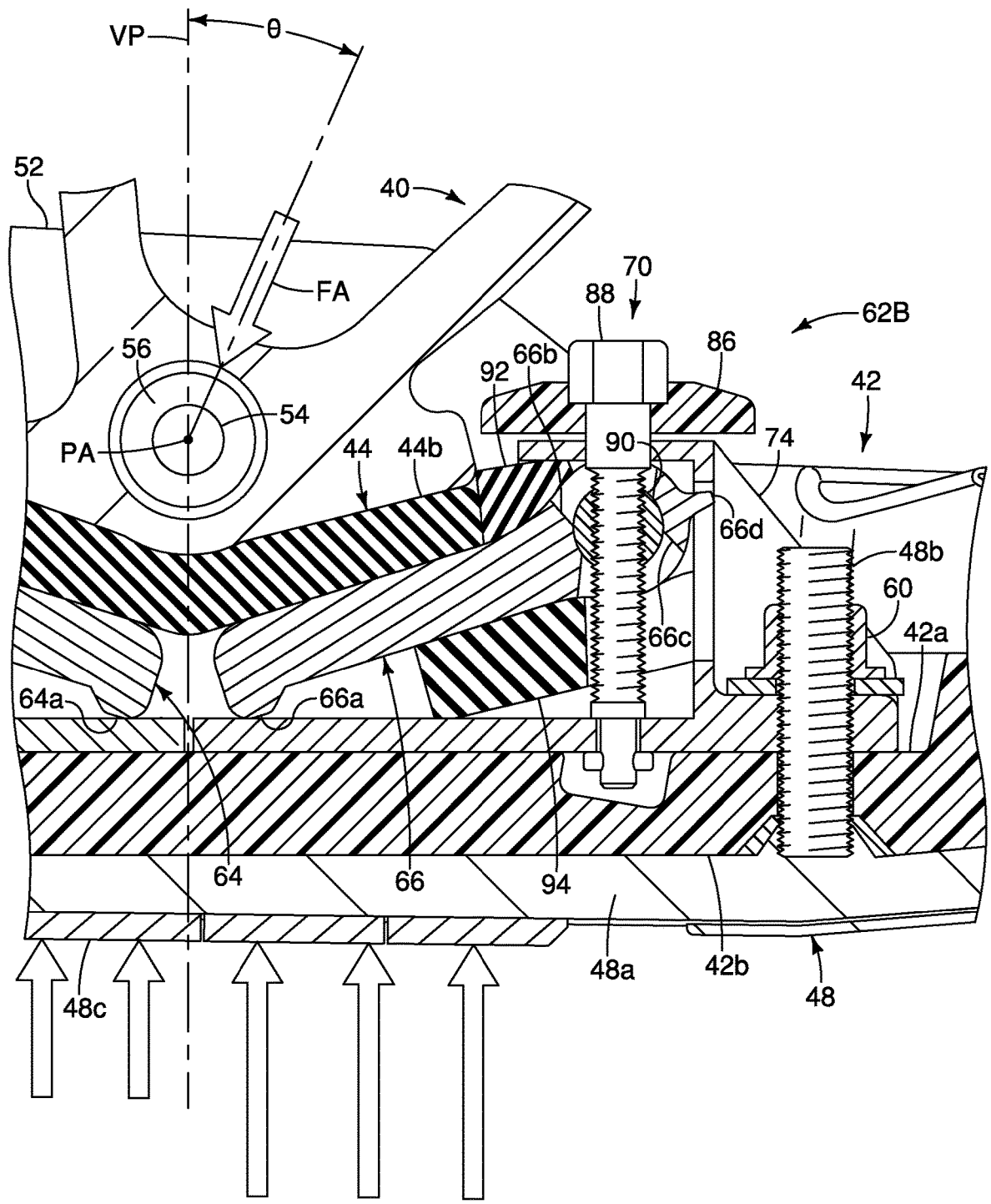
FIG. 14 is a further enlarged cross-sectional view of a portion of the snow ski assembly illustrated in FIG. 3 but in which the adjustment members are set so that the ski stopper has the highest compression characteristic.
Figure 15:
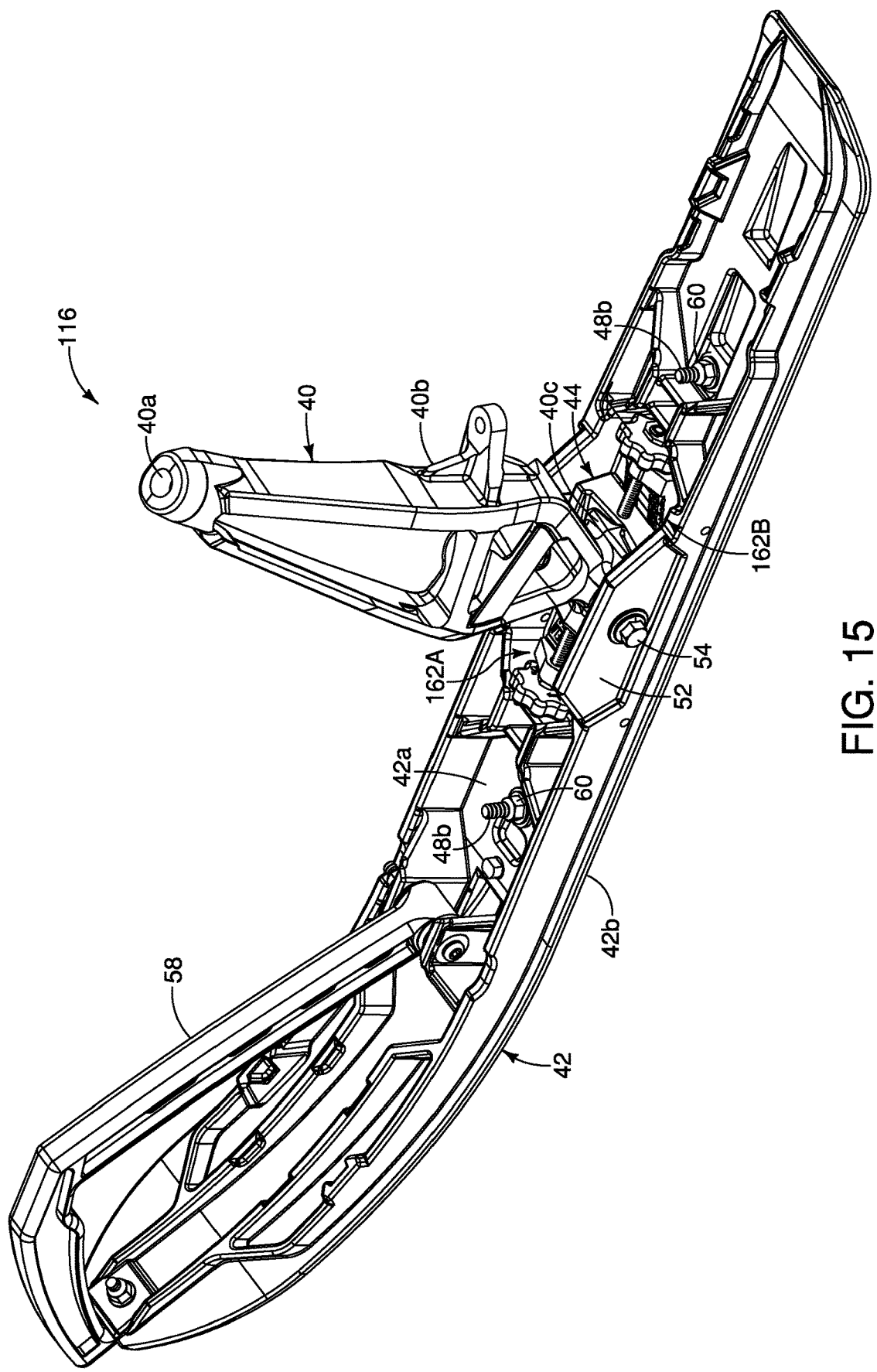
FIG. 15 is a perspective view of a snow ski assembly in accordance with a second embodiment.
Figure 16:
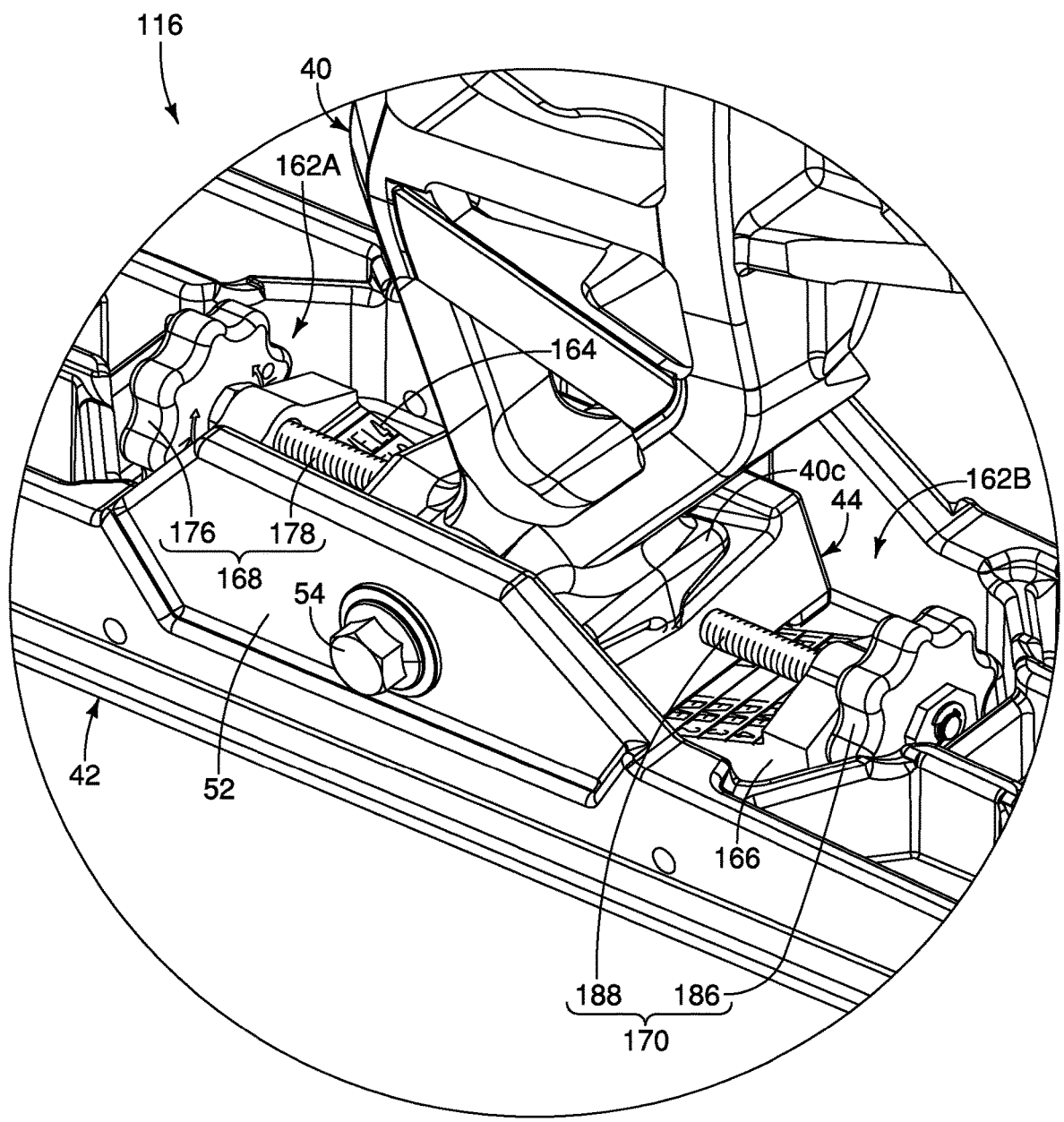
FIG. 16 is an enlarged perspective view of a portion of the snow ski assembly illustrated in FIG. 15 as viewed from a rear side of the ski spindle.
Figure 17:
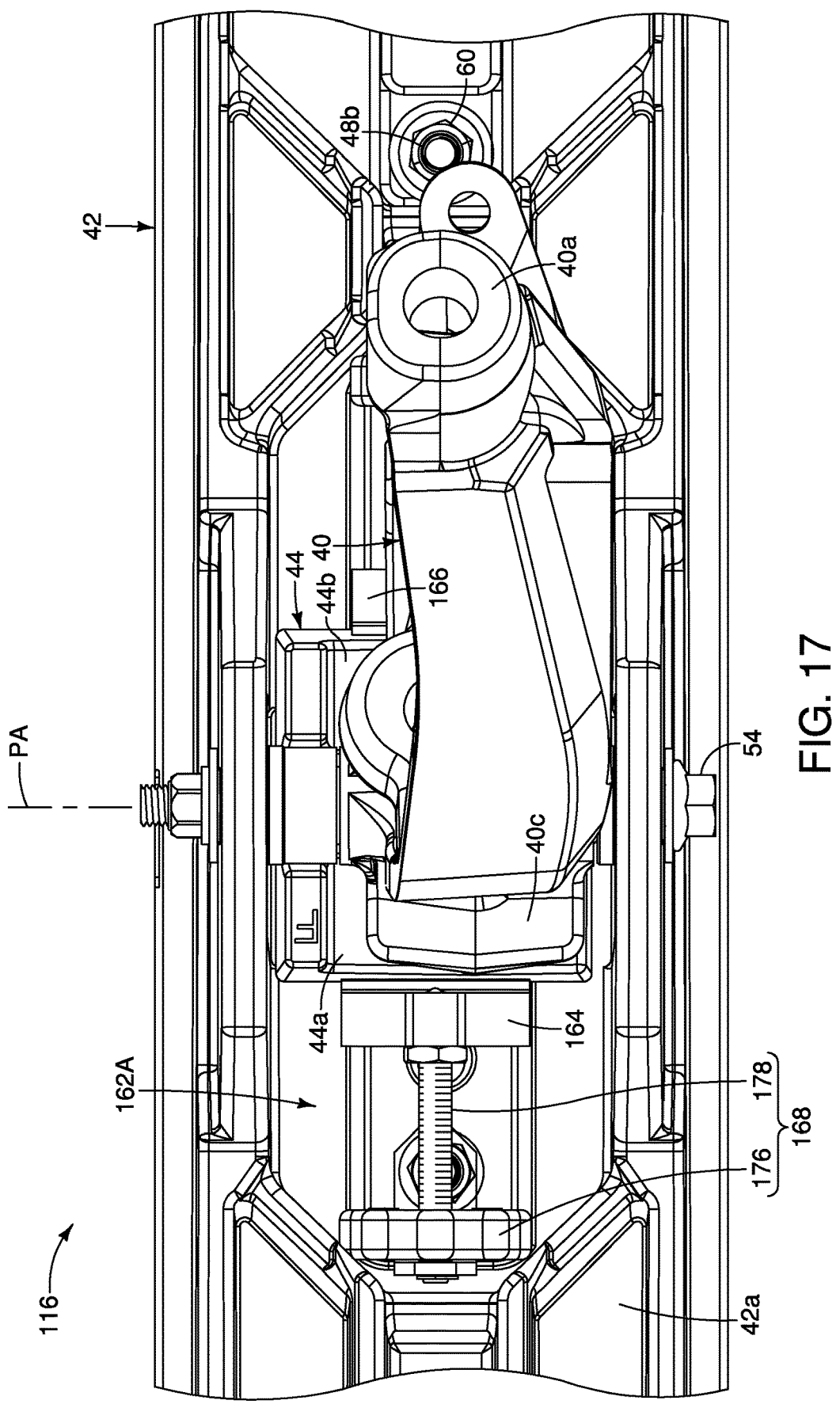
FIG. 17 is a top view of a portion of the snow ski assembly illustrated in FIG. 15.

To limit the movement the ski body 42 relative to the ski spindle 40 or to control the force/moment to pivot the ski body 42 relative to the ski spindle 40, the ski stopper 44 is disposed between the upper surface 42a of the ski body 42 and the lower end 40c of the ski spindle 40. The ski stopper 44 is an elastomeric member that is resiliently compressible as the ski body 42 pivots relative to the ski spindle 40 about the pivot axis PA. For example, the ski stopper 44 is a one-piece rubber member. The ski stopper 44 includes a front portion 44a that is located forward of the pivot axis PA and a rear portion 44b that is located rearward of the pivot axis PA. In other words, the ski stopper 44 is divided into the front portion 44a and the rear portion 44b by a vertical plane VP that passes through the pivot axis PA when the snowmobile 10 is on a level horizontal surface. The front portion 44a and the rear portion 44b of the ski stopper 44 contact the lower end 40c of the ski spindle 40 to transfer a force or load FA from the ski spindle 40 to the keel 42c. As seen in FIG. 9, a caster angle θ is formed between the vertical plane VP and the resultant vector of the force FA from the ski spindle 40 to the keel 42c that passes through the pivot axis PA.

Here, the ski body 42 is also provided with a handle 58 that is removably mounted to the upper surface 42a of the ski body 42. Of course, it will be apparent from this disclosure that the handle 58 can be non-removable from the ski body 42. The handle 58 preferably is provided at a forward portion of the ski body 42. When the handle 58 is provided, the handle 58 enables the rider to pull the snowmobile 10 or manually move the front end of the snowmobile 10.

The keel 42c protrudes from the ski body 42. The wear bar 48 includes a base 48a and a plurality of attachment bolts 48b. The base 48a of the wear bar 48 projects from the keel 42c of the ski body 42 into the snow when the snow ski assembly 16 is assembled and mounted to the snowmobile 10. The base 48a is preferably provided with a cleat 48c that is coupled to a lower surface of the base 48a. The base 48a preferably comprises iron, steel, carbide, or some other long-wearing material to extend the life of the keel 42c. The cleat 48c preferably is a carbide tip that reduces side-slip when the snowmobile 10 is operated on ice or the like. The attachment bolts 48b extend upwardly from the base 48a of the wear bar 48 and extend through openings in the ski body 42. A nut 60 is screwed onto the upper ends of the attachment bolts 48b to securely fasten the wear bar 48 to the ski body 42.

In the first embodiment, as seen in FIGS. 3 to 7, the snow ski assembly 16 further includes a ski keel pressure adjuster 62. The ski keel pressure adjuster 62 is designed to provide quick and easy adjustability to the handling of the snowmobile 10 (e.g., the snow vehicle). With the ski keel pressure adjuster 62, the user can customize the feel and performance of the snow ski assemblies 16 to meet the riding conditions as they change and to match the user's preference based on the user's riding style. In particular, the ski keel pressure adjuster 62 is configured to change a compression characteristic of the ski stopper 44 without detaching the ski body 42 from the ski spindle 40. More specifically, by changing the compression characteristic of the ski stopper 44, the ski keel pressure adjuster 62 adjusts the transfer the force or load FA from the ski spindle 40 to the keel 42a such that a reaction load profile on the bottom of the ski body 42 is changed as needed and/or desired.

To change the compression characteristic of the ski stopper 44, the ski keel pressure adjuster 62 includes at least one adjustment member and at least one user input such that the compression characteristic of the ski stopper 44 can be adjusted without detaching the ski body 42 from the ski spindle 40. The at least one user input is operatively coupled to the at least one adjustment member to move the at least one adjustment member in response to operation of the at least one user input. As explained below, the at least one adjustment member movably of the ski keel pressure adjuster 62 is disposed with respect to the ski stopper 44 between at least two positions and the at least one user input is operatively coupled to the at least one adjustment member to selectively establish the at least two positions without detaching the ski body 42 from the ski spindle 40. For example, the at least one adjustment member of the ski keel pressure adjuster 62 is movably disposed with respect to the ski body 42 between a first position in which the ski stopper 44 has a first compression characteristic and a second position in which the ski stopper 44 has a second compression characteristic.

Here, in the first embodiment, the at least one adjustment member of the ski keel pressure adjuster 62 includes at least one of a front adjustment member 64 and a rear adjustment member 66. Also, in the first embodiment, the at least one user input includes a front user input 68 that is operatively coupled to the front adjustment member 64, and a rear user input 70 that is operatively coupled to the rear adjustment member 66. Preferably, the front user input 68 and the rear user input 70 are toolless user inputs that can be operated without using a tool. Here, the ski keel pressure adjuster 62 includes a front adjuster 62A, which includes the front adjustment member 64 and the front user input 68, and a rear adjuster 62B, which includes the rear adjustment member 66 and the rear user input 70.

While the ski keel pressure adjuster 62 in the first embodiment includes both the front adjuster 62A and the rear adjuster 62B, it will be apparent from this disclosure that the ski body 42 can be equipped with only the front adjuster 62A or only the rear adjuster 62B as needed and/or desired. As will be apparent, the front adjuster 62A and the rear adjuster 62B are independently adjustable so that the compression characteristic of the front portion 44a of the ski stopper 44 can be independently adjusted relative to the compression characteristic of the rear portion 44b of the ski stopper 44. Alternatively, the ski keel pressure adjuster 62 could be configured such that the compression characteristics of the front and rear portions 44a and 44b are adjusted simultaneously as needed and/or desired.

The front adjustment member 64 is arranged to selectively compress the front portion 44a of the ski stopper 44 as the front adjustment member 64 is adjusted using the front user input 68. For example, the front adjustment member 64 moves with respect to the ski body 42 between a first position in which the front portion 44a of the ski stopper 44 has a first compression characteristic and a second position in which the front portion 44a of the ski stopper 44 has a second compression characteristic. Here, in the first embodiment, the front adjustment member 64 is infinitely adjustable between a low position and a high position as will be explained below.

Similarly, the rear adjustment member 66 is arranged to selectively compress the rear portion 44b of the ski stopper 44 as the rear adjustment member is adjusted the rear user input 70. For example, the rear adjustment member 66 moves with respect to the ski body 42 between a first position in which the rear portion 44b of the ski stopper 44 has a first compression characteristic and a second position in which the rear portion 44b of the ski stopper 44 has a second compression characteristic. Here, in the first embodiment, the rear adjustment member 66 is infinitely adjustable between a low position and a high position as will be explained below.

Thus, the ski keel pressure adjuster 62 is one example of an adjusting means for changing a ski keel pressure without detaching the ski body 42 from the ski spindle 40. Here, the adjusting means is configured to change a compression characteristic of the ski stopper 44 without detaching the ski body 42 from the ski spindle 40. The adjusting means can be defined only the front adjuster 62A, or only the rear adjuster 62B, or both. In other words, the adjusting means can carry out the function of changing a compression characteristic of the ski stopper 44 by changing only the front portion 44a of the ski stopper 44 or changing only the rear portion 44b of the ski stopper 44, or both.

Here, in the first embodiment, the front adjuster 62A and the rear adjuster 62B are mirror images of each other when installed on the ski body 42. In this way, the front adjustment member 64 and the rear adjustment member 66 are arranged as mirror images of each other when installed on the ski body 42. Thus, the description of the front adjustment member 64 applies to the rear adjustment member 66, and vice versa. Likewise, in the first embodiment, the front user input 68 and the rear user input 70 are arranged as mirror images of each other when installed on the ski body 42. Thus, the description of the front adjustment member 64 applies to the rear user input 70, and vice versa.

In the first embodiment, the front adjuster 62A of the ski keel pressure adjuster 62 includes a front adjuster housing 72, and the rear adjuster 62B of the ski keel pressure adjuster 62 includes a rear adjuster housing 74. The front adjuster housing 72 supports the front adjustment member 64 and the front user input 68. The rear adjuster housing 74 supports the rear adjustment member 66 and the rear user input 70. The front adjuster housing 72 and the rear adjuster housing 74 are separately mounted to the ski body 42. In particular, the front adjuster housing 72 and the rear adjuster housing 74 are each attached to the ski body 42 via one of the attachment bolts 48b of the wear bar 48 and one of the nuts 60. While the front adjuster housing 72 and the rear adjuster housing 74 are separate parts, it will be apparent from this disclosure that the ski keel pressure adjuster 62 can have a single housing that supports the front adjustment member 64, the rear adjustment member 66, the front user input 68 and the rear user input 70.

The front user input 68 includes a front knob 76 and a front adjustment screw 78 that is coupled to the front knob 76 so that the front knob 76 and the front adjustment screw 78 move together as a unit. In other words, the front adjustment screw 78 rotates as the front knob 76 is turned by a user. For example, the front knob 76 is molded onto the front adjustment screw 78. The front adjustment screw 78 is rotatably supported on the front adjuster housing 72 such that the front knob 76 is located on top of the front adjuster housing 72 so that the user can easily access the front knob 76.

The front adjustment member 64 is coupled to the front adjustment screw 78 so that the front adjustment member 64 can be moved to contact the ski stopper 44 and change the compression characteristic of the ski stopper 44. In particular, the front adjustment member 64 is basically a lever that has a fulcrum 64a at one end and an attachment bore 64b at the other end. The attachment bore 64b is configured to receive a barrel nut 80. The barrel nut 80 is rotatably supported in the attachment bore 64b and has a threaded hole 80a for threadedly receiving the front adjustment screw 78 therein. Preferably, the threaded hole 80a has a screw-locking insert such as a Heli-Coil® locking element to keep the barrel nut 80 from inadvertently moving along the front adjustment screw 78. Alternatively, the front adjustment member 64 can be provided with a detent arrangement to keep the barrel nut 80 from inadvertently moving along the front adjustment screw 78. The adjustment member 64 is also provided with an opening 64c that passes through the attachment bore 64b for receiving the front adjustment screw 78. Thus, as seen in FIG. 9, the front adjustment member 64 has a first portion (a majority of the front adjustment member 64) that is disposed between the ski stopper 44 and the ski body 42 and a second portion (the end with the attachment bore 64b) that is coupled to the front user input 68. In this way, the front adjustment member 64 is at least partially movable in a direction away from the ski body 42 as the front adjustment member 64 moves between the different positions in response to a force increasing operation of the front user input 68. Also, the front adjustment member 64 is at least partially movable in a direction toward the ski body 42 as the front adjustment member 64 moves between the different positions in response to a force decreasing operation of the front user input 68.

Preferably, the front adjustment member 64 has an indicator part 64d that can be used to visually determine the position if the front adjustment member 64. Preferably, the front adjuster housing 72 is provided with indicia or other markings (e.g., horizontal lines, High, Med, Low) that can align with the indicator part 64d to indicate a current position of the front adjustment member 64 with respect to the ski body 42. When the indicator part 64d is in the "Low" position, the front portion 44a of the ski stopper 44 is only in partial contact with the lower end 40c of the ski spindle 40 and the front portion 44a of the ski stopper 44 is unloaded. When the indicator part 64d moves from the "Low" position towards the "High" position, the front adjustment member 64 gradually compress the front portion 44a of the ski stopper 44. Typically, by increasing the compression of the front portion 44a of the ski stopper 44, a lower steering effort is needed to turn the ski body 42. On the other hand, by decreasing the compression of the front portion 44a of the ski stopper 44, a higher steering effort is needed to turn the ski body 42. Also, by changing the compression of the front portion 44a of the ski stopper 44 effects of darting can be the ski body 42 can be adjusted.

To help keep water and/or snow out of the front adjuster housing 72, an upper compressible pad 82 and a lower compressible pad 84 are optionally provided in the front adjuster housing 72. The upper compressible pad 82 and the lower compressible pad 84 are formed of a very compressible and resilient material such as a soft foam rubber. The upper compressible pad 82 and the lower compressible pad 84 are designed to easily compress and/or expand as the front adjustment member 64 is adjusted.

The rear user input 70 includes a rear knob 86 and a rear adjustment screw 88 that is coupled to the rear knob 86 so that the rear knob 86 and the rear adjustment screw 88 move together as a unit. In other words, the rear adjustment screw 88 rotates as the rear knob 86 is turned by a user. For example, the rear knob 86 is molded onto the rear adjustment screw 88. The rear adjustment screw 88 is rotatably supported on the rear adjuster housing 74 such that the rear knob 86 is located on top of the rear adjuster housing 74 so that the user can easily access the rear knob 86.

The rear adjustment member 66 is coupled to the rear adjustment screw 88 so that the rear adjustment member 66 can be moved to contact the ski stopper 44 and change the compression characteristic of the ski stopper 44. In particular, the rear adjustment member 66 is basically a lever that has a fulcrum 66a at one end and an attachment bore 66b at the other end. The attachment bore 66b is configured to receive a barrel nut 90. The barrel nut 90 is rotatably supported in the attachment bore 66b and has a threaded hole 90a for threadedly receiving the rear adjustment screw 88 therein. Preferably, the threaded hole 90a has a screw-locking insert such as a Heli-Coil® locking element to keep the barrel nut 90 from inadvertently moving along the rear adjustment screw 88. Alternatively, the rear adjustment member 66 can be provided with a detent arrangement to keep the barrel nut 90 from inadvertently moving along the rear adjustment screw 88. The adjustment member 66 is also provided with an opening 66c that passes through the attachment bore 66b for receiving the rear adjustment screw 88. Thus, the rear adjustment member 66 has a first portion (a majority of the rear adjustment member 66) that is disposed between the ski stopper 44 and the ski body 42 and a second portion (the end with the attachment bore 66b) that is coupled to the rear user input 70. In this way, the rear adjustment member 66 is at least partially movable in a direction away from the ski body 42 as the rear adjustment member 66 moves between the different positions in response to a force increasing operation of the rear user input 70. Also, the rear adjustment member 66 is at least partially movable in a direction toward the ski body 42 as the rear adjustment member 66 moves between the different positions in response to a force decreasing operation of the rear user input 70.

Preferably, the rear adjustment member 66 has an indicator part 66d that can be used to visually determine the position if the rear adjustment member 66. Preferably, the rear adjuster housing 74 is provided with indicia or other markings (e.g., horizontal lines, High, Med, Low) that can align with the indicator part 66d to indicate a current position of the rear adjustment member 66 with respect to the ski body 42. When the indicator part 66d is in the "Low" position, the rear portion 44b of the ski stopper 44 is in contact with the lower end 40c of the ski spindle 40 and the rear portion 44b of the ski stopper 44 is preloaded. When the indicator part 66d moves from the "Low" position towards the "High" position, the rear adjustment member 66 gradually compress the rear portion 44b of the ski stopper 44.

Typically, by increasing the compression of the rear portion 44b of the ski stopper 44, less understeer occurs in soft snow. On the other hand, by decreasing the compression of the rear portion 44b of the ski stopper 44, less steering effort is needed to turn the ski body 42 on hard snow conditions.

To help keep water and/or snow out of the rear adjuster housing 74, an upper compressible pad 92 and a lower compressible pad 94 are optionally provided in the rear adjuster housing 74. The upper compressible pad 92 and the lower compressible pad 94 are formed of a very compressible and resilient material such as a soft foam rubber. The upper compressible pad 92 and the lower compressible pad 94 are designed to easily compress and/or expand as the rear adjustment member 66 is adjusted.

Referring now to FIGS. 15 to 19, a snow ski assembly 116 is illustrated in accordance with a second embodiment for use with the snowmobile 10. The snow ski assembly 116 is identical to the snow ski assembly 16, as discussed above, except that the front adjuster 62A and the rear adjuster 62B have been replaced with a front adjuster 162A and a rear adjuster 162B in the snow ski assembly 116. Thus, the parts of the snow ski assembly 116 that are identical to those parts of the snow ski assembly 16 will be given the same reference symbol, their descriptions will not be repeated for the sake of brevity.

Similar to the first embodiment, the front adjuster 162A and the rear adjuster 162B are designed to provide quick and easy adjustability to the handling of the snowmobile 10 (e.g., the snow vehicle). With the front adjuster 162A and the rear adjuster 162B, the user can customize the feel and performance of the snow ski assembly 116 to meet the riding conditions as they change and to match the user's preference based on the user's riding style. In particular, the front adjuster 162A and the rear adjuster 162B are configured to change a compression characteristic of the ski stopper 44 without detaching the ski body 42 from the ski spindle 40.

The front adjuster 162A and the rear adjuster 162B are each examples of an adjusting means for changing a compression characteristic of the ski stopper 44 without detaching the ski body 42 from the ski spindle 40. The adjusting means can be defined only the front adjuster 162A, or only the rear adjuster 162B, or both. In other words, the adjusting means can carry out the function of changing a compression characteristic of the ski stopper 44 by changing only the compression characteristic of the front portion 44a of the ski stopper 44 or changing only the compression characteristic of the rear portion 44b of the ski stopper 44, or both.

Figure 18:
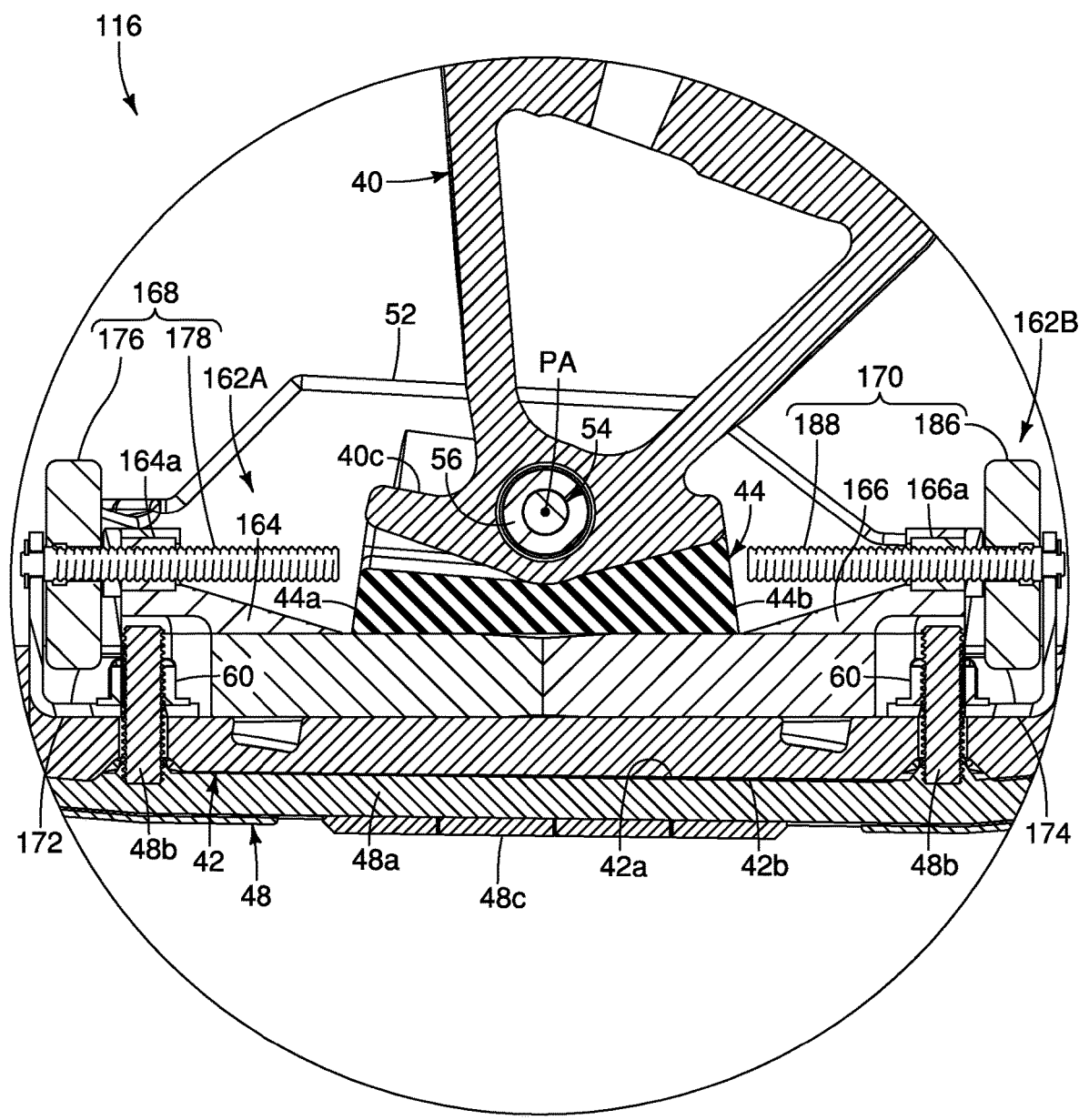
FIG. 18 is an enlarged cross-sectional view of a portion of the snow ski assembly illustrated in FIG. 15 in which the adjustment members are set so that the ski stopper has the lowest compression characteristic.
Figure 19:
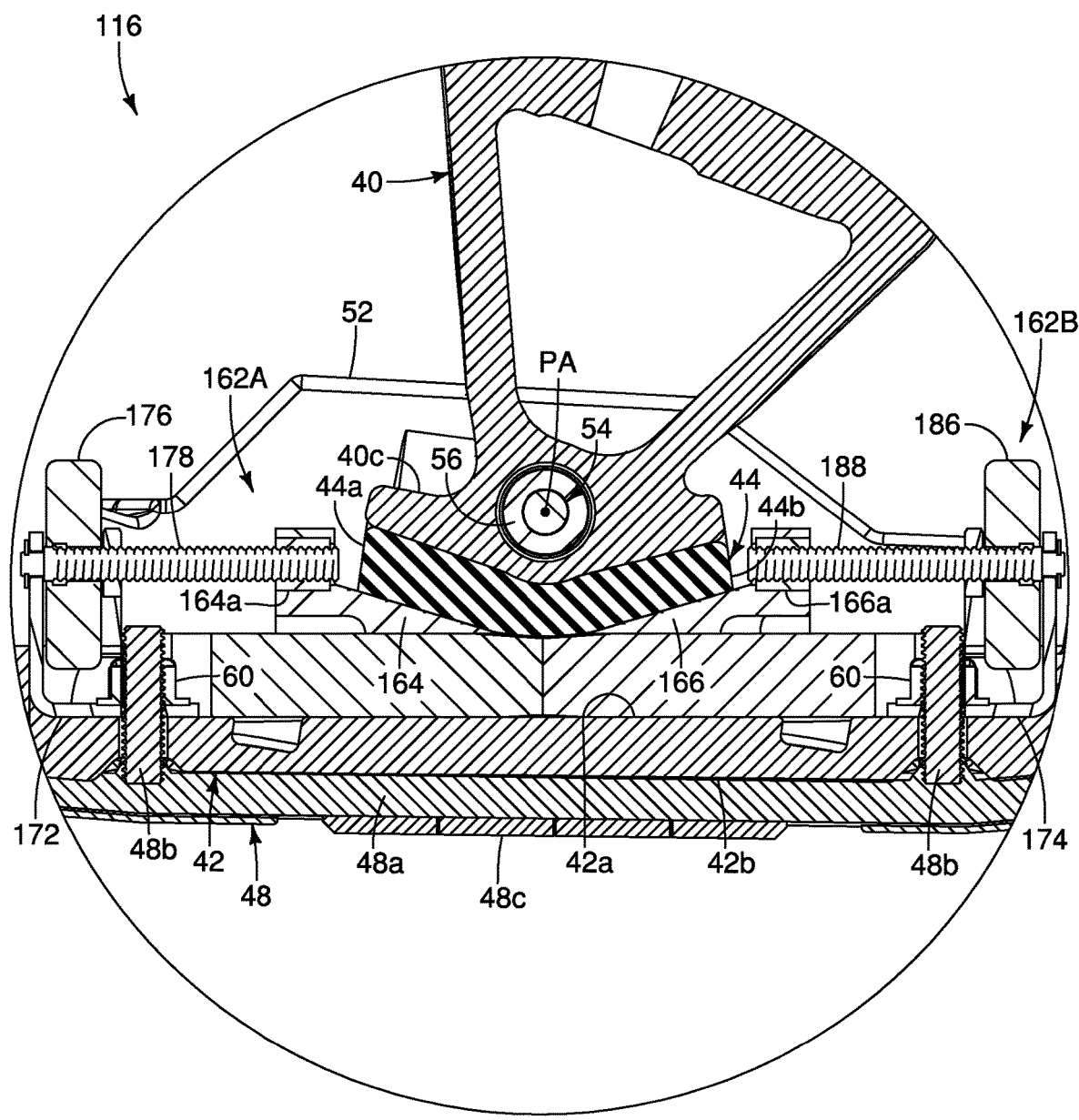
FIG. 19 is an enlarged cross-sectional view of a portion of the snow ski assembly illustrated in FIG. 15 but in which one of the adjustment members is set so that a front portion of the ski stopper has the highest compression characteristic and a rear portion of the ski stopper has the highest compression characteristic.
Figure 20:
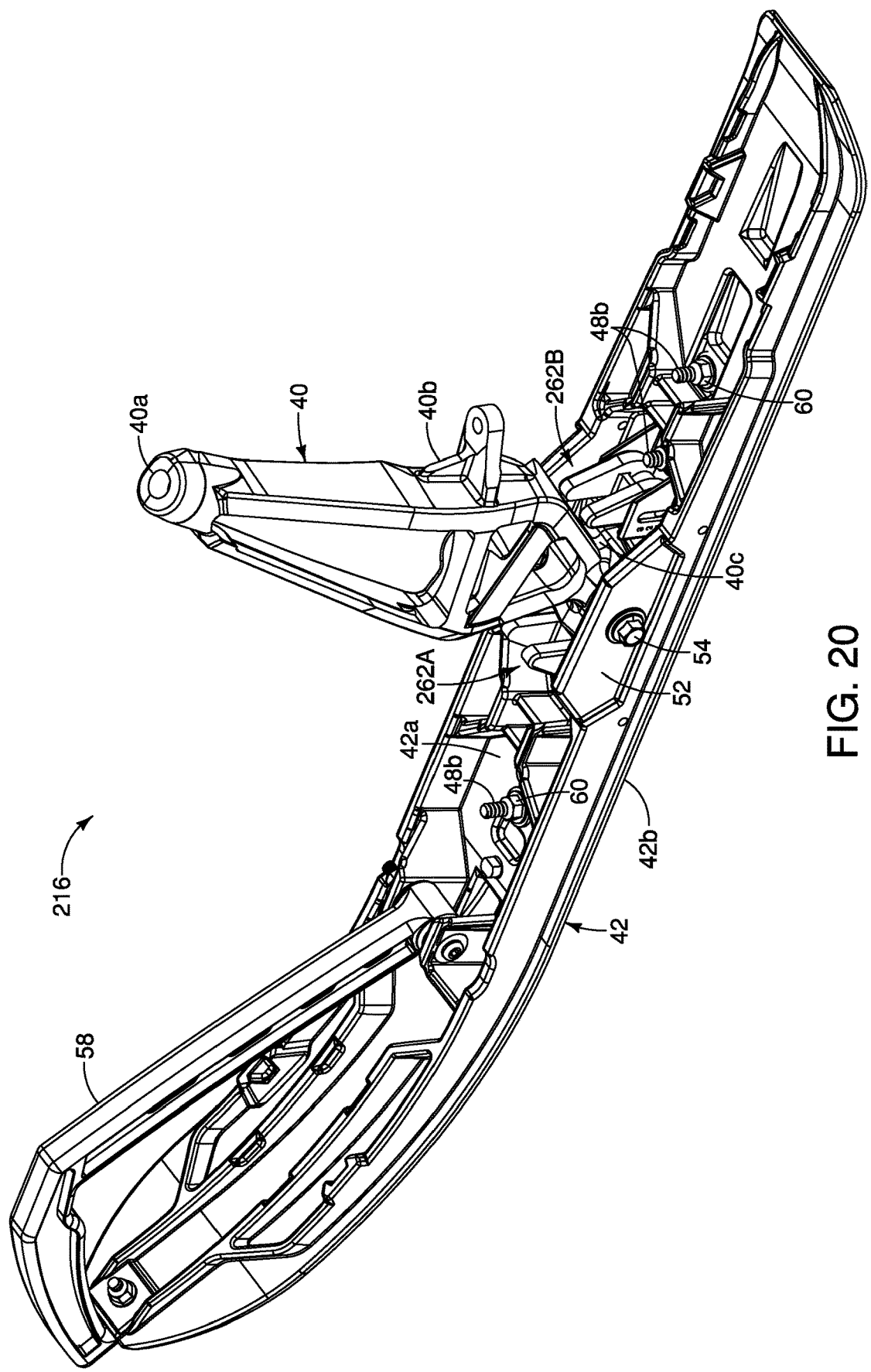
FIG. 20 is a perspective view of a snow ski assembly in accordance with a third embodiment.
Figure 21:
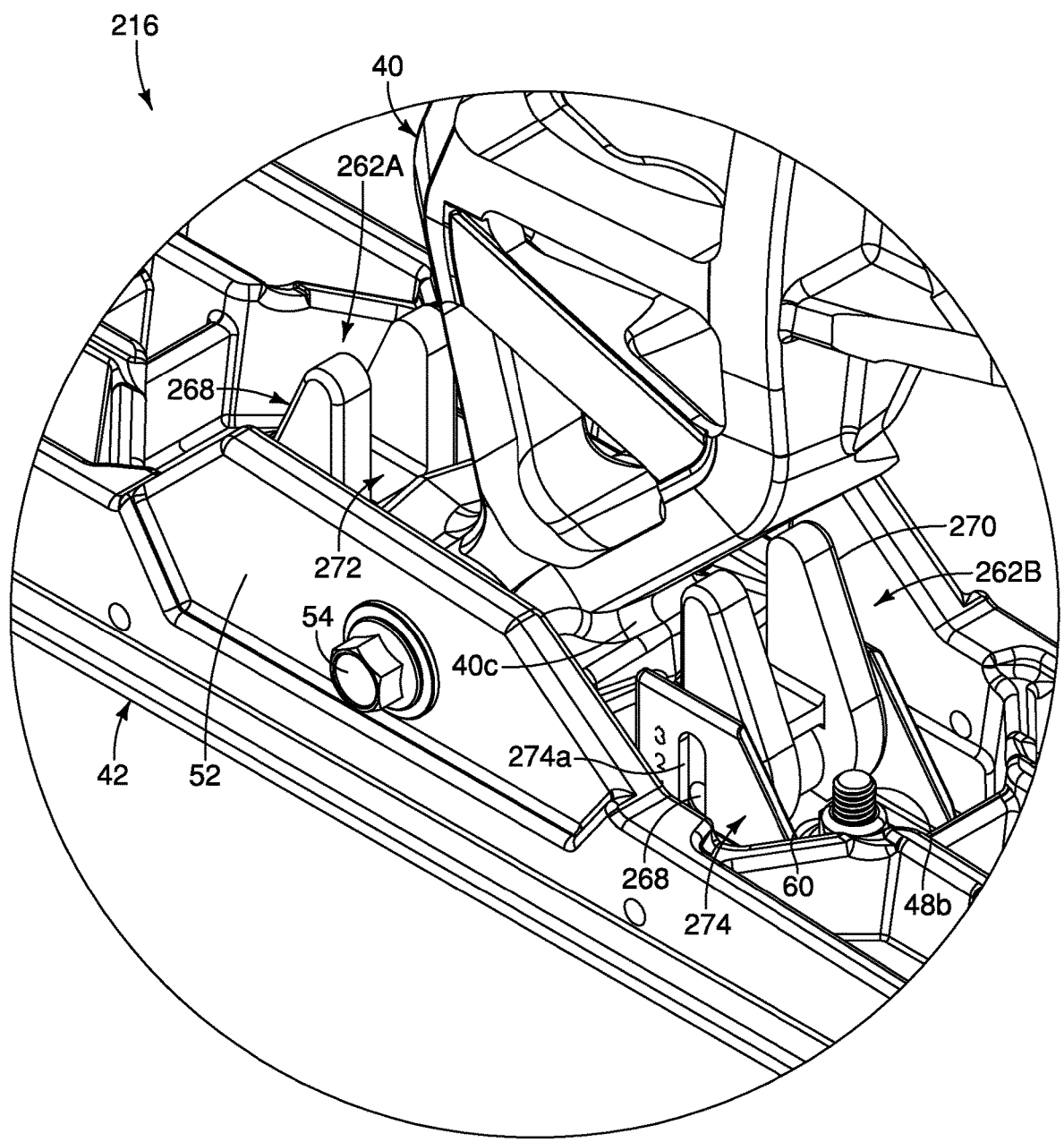
FIG. 21 is an enlarged perspective view of a portion of the snow ski assembly illustrated in FIG. 20 as viewed from a rear side of the ski spindle.
Figure 22:
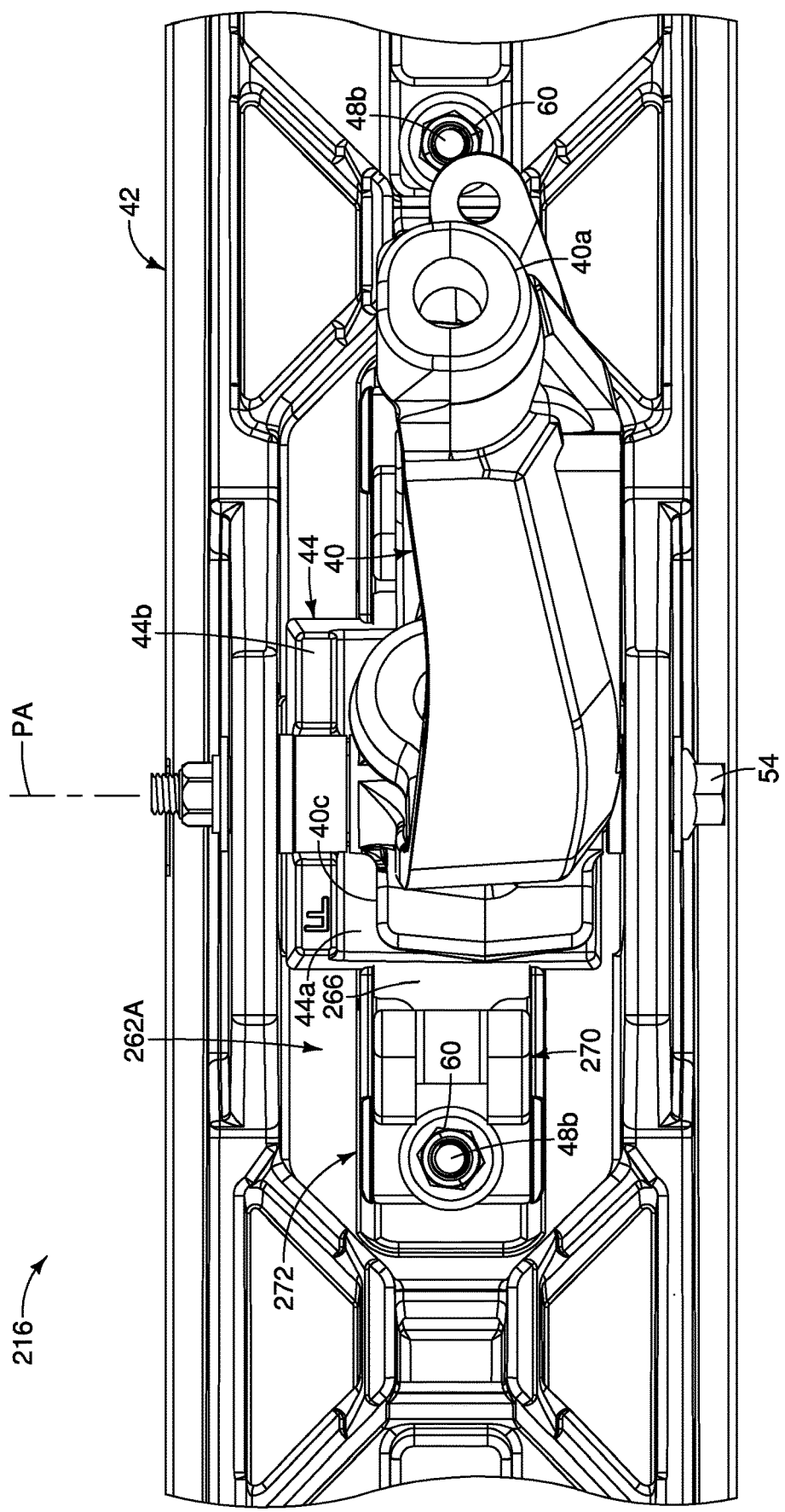
FIG. 22 is a top view of a portion of the snow ski assembly illustrated in FIG. 20.
Figure 23:
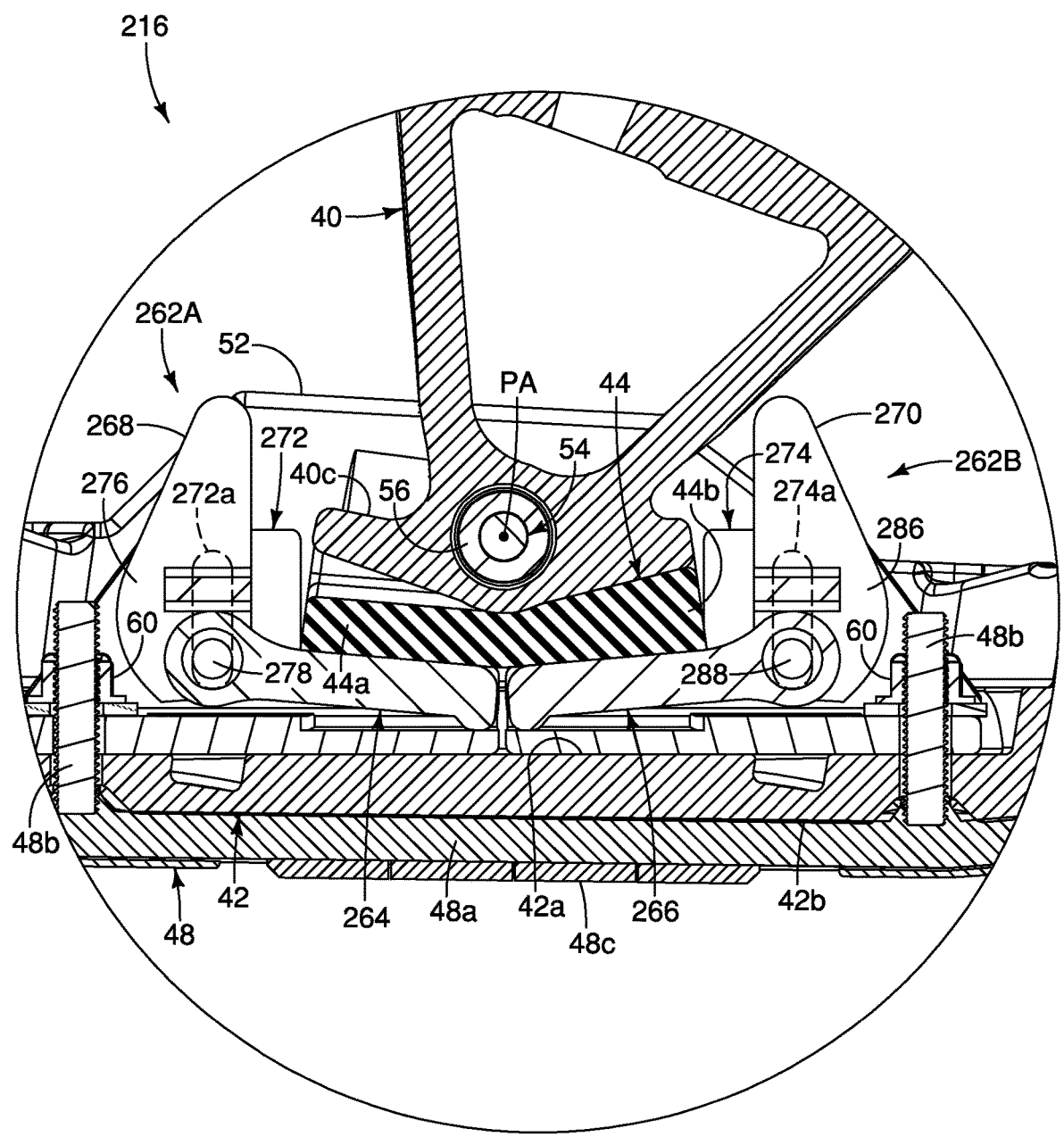
FIG. 23 is an enlarged cross-sectional view of a portion of the snow ski assembly illustrated in FIG. 20 in which the adjustment members are set so that the ski stopper has the lowest compression characteristic.
Figure 24:
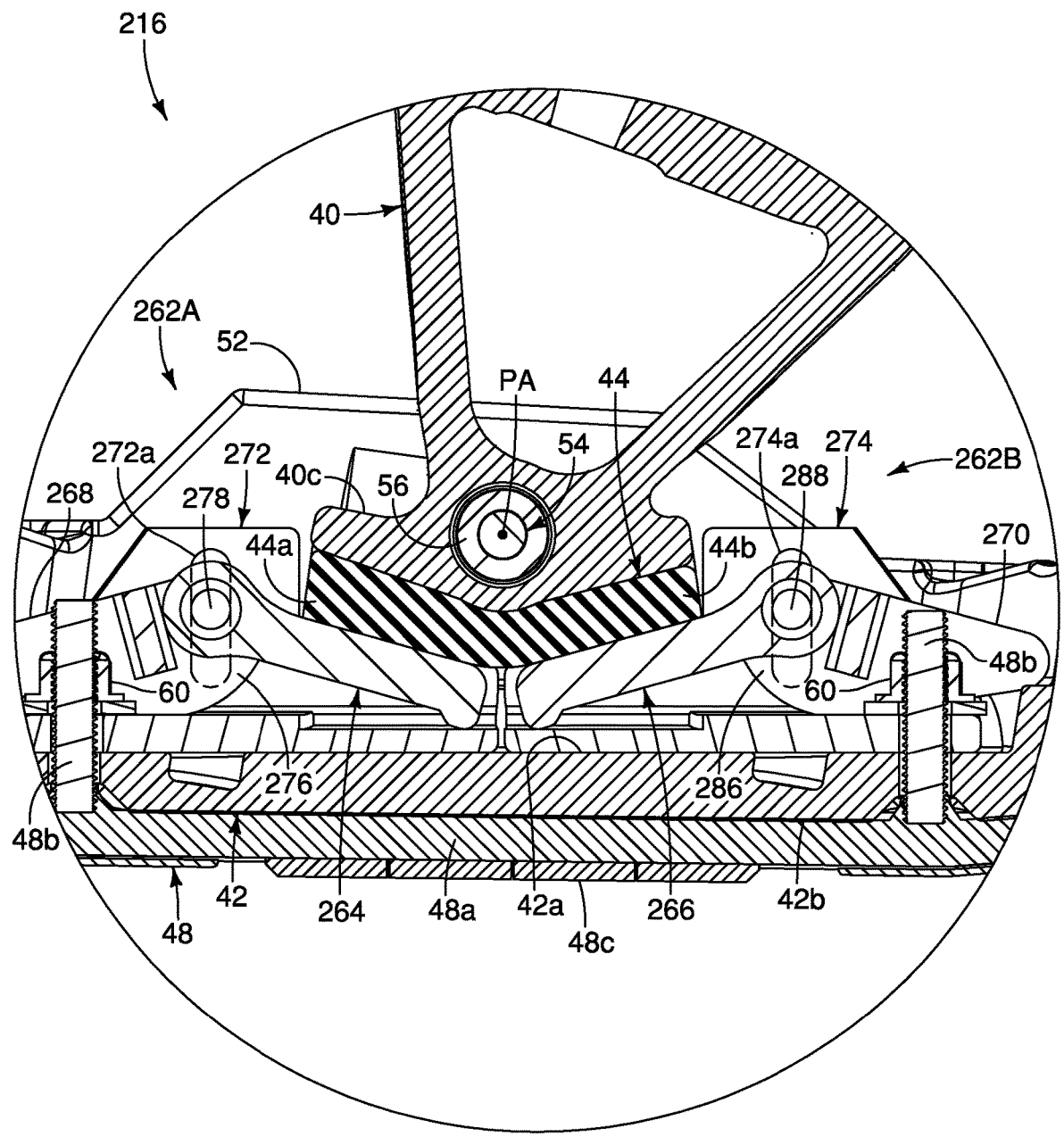
FIG. 24 is an enlarged cross-sectional view of a portion of the snow ski assembly illustrated in FIG. 20 but in which the adjustment members are set so that the ski stopper has the highest compression characteristic.
Figure 25:
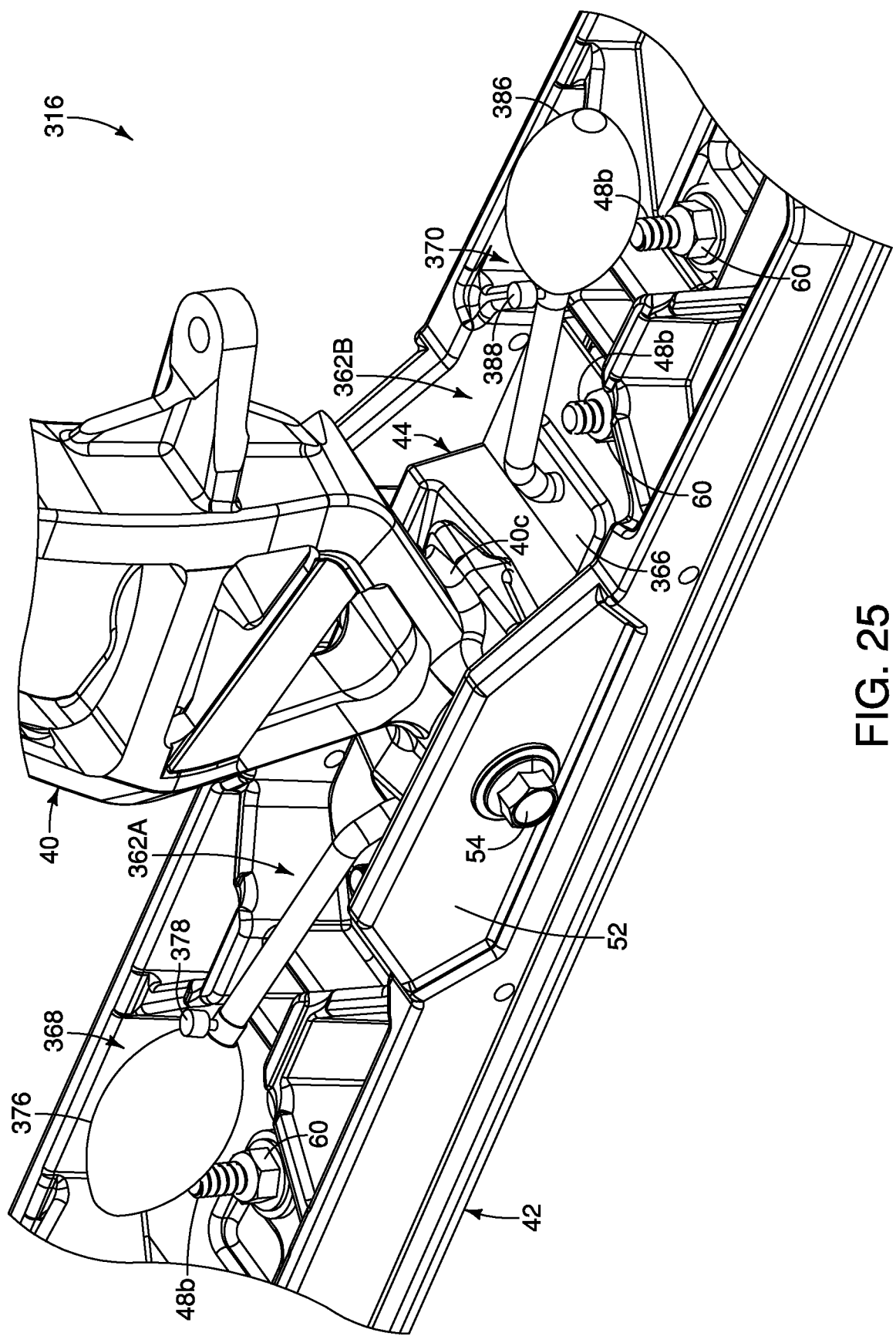
FIG. 25 is an enlarged perspective view of a portion of a snow ski assembly in accordance with a fourth embodiment.
Figure 26:
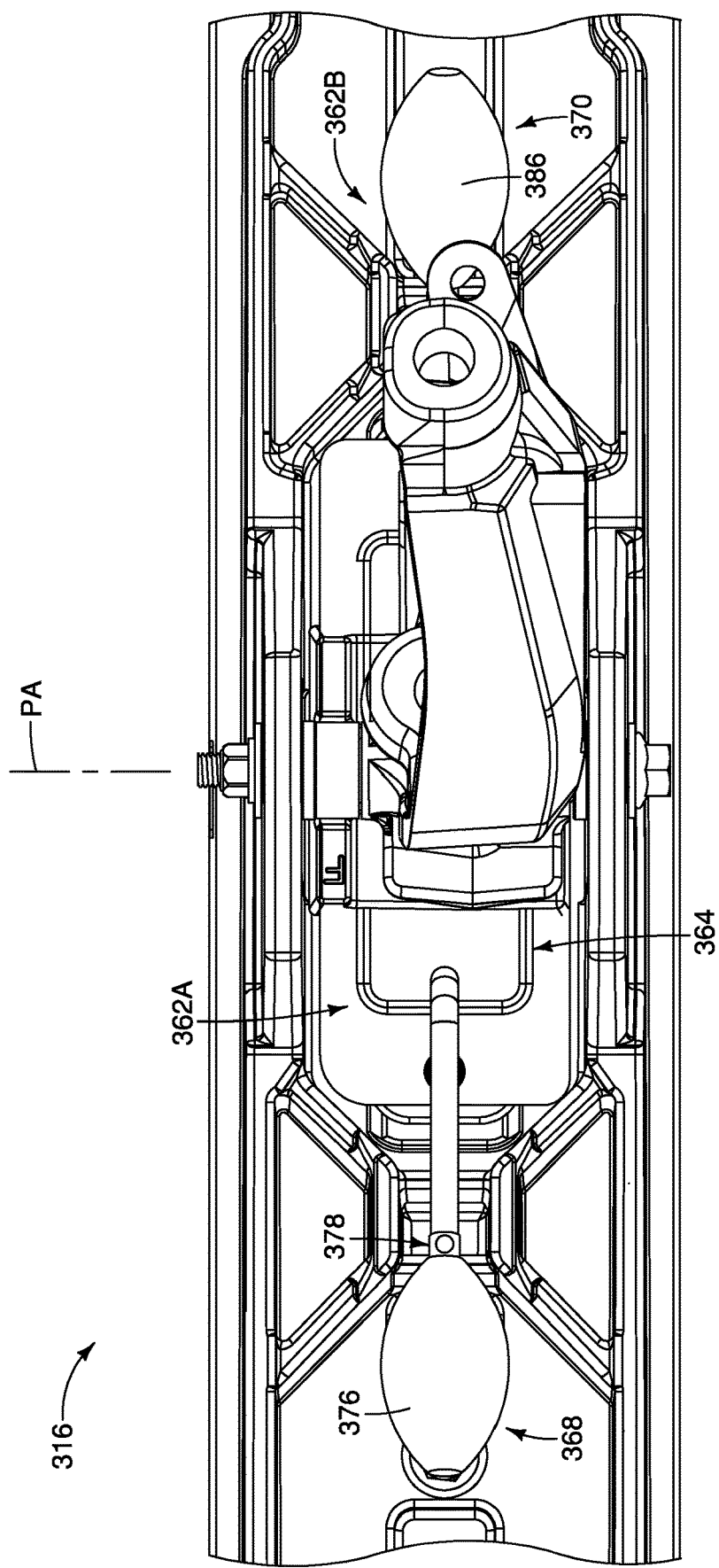
FIG. 26 is a top view of a portion of the snow ski assembly illustrated in FIG. 25.
Figure 27:
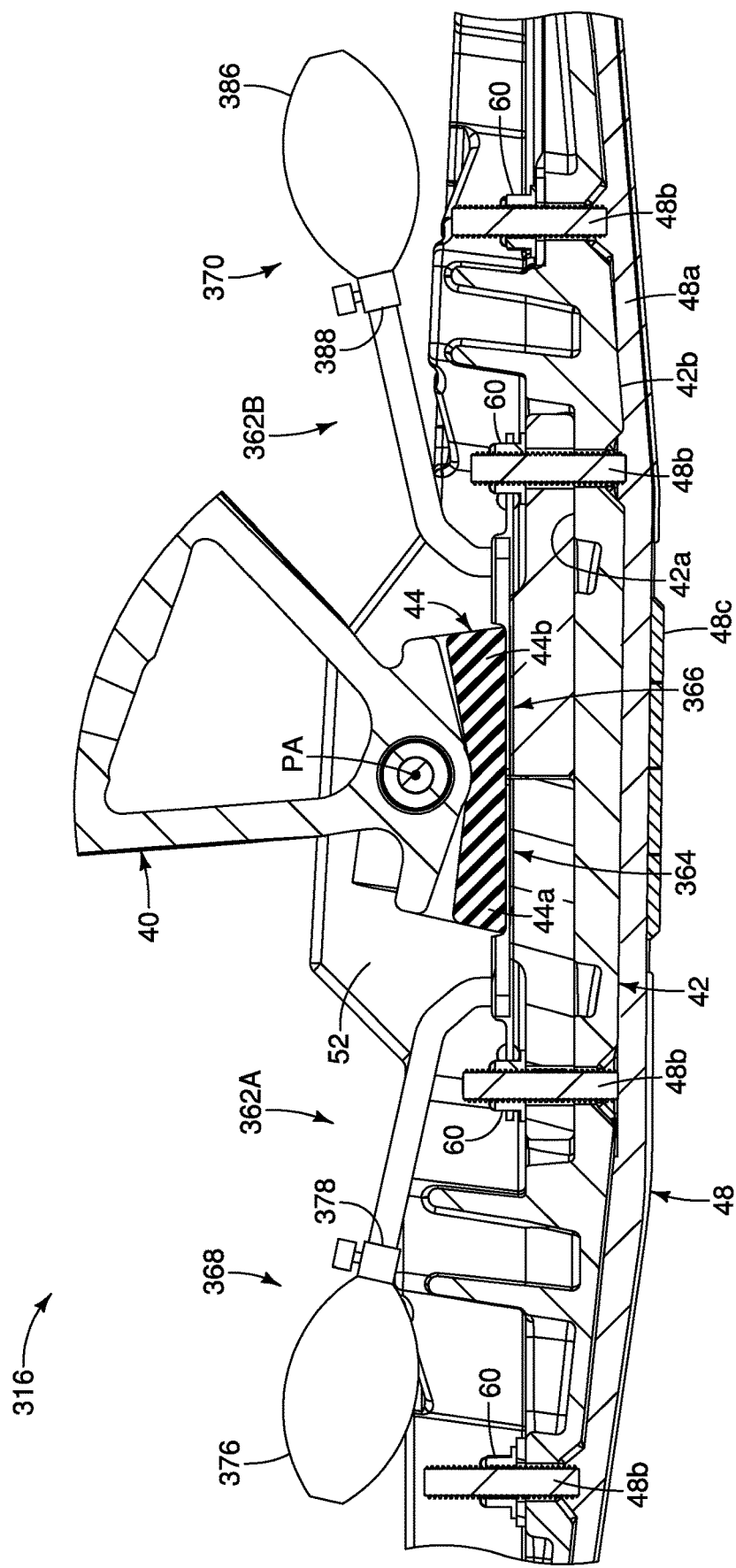
FIG. 27 is an enlarged cross-sectional view of a portion of the snow ski assembly illustrated in FIG. 25 in which the adjustment members are set so that the ski stopper has the lowest compression characteristic.
Figure 28:
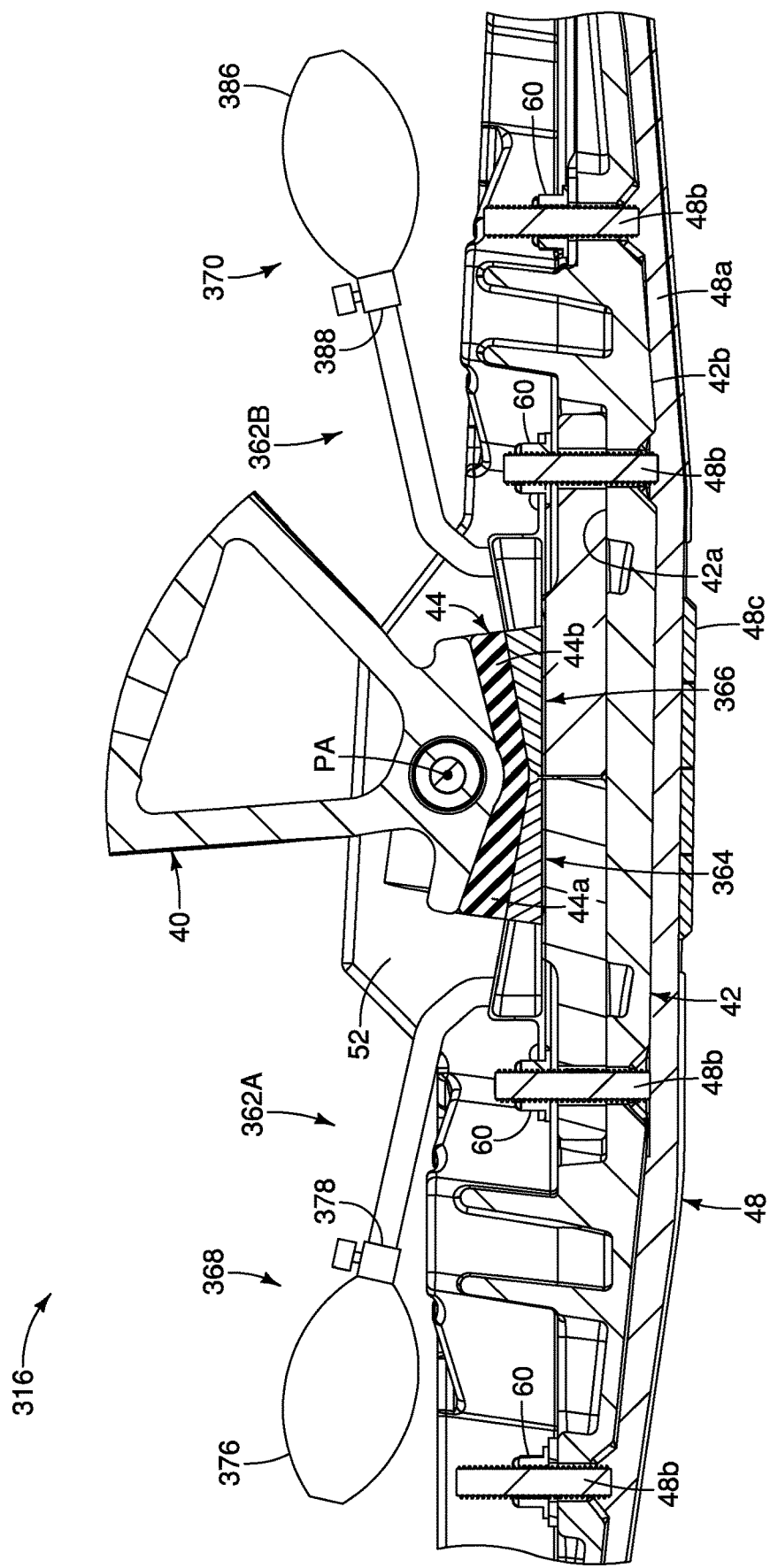
FIG. 28 is an enlarged cross-sectional view of a portion of the snow ski assembly illustrated in FIG. 25 but in which the adjustment members are set so that the ski stopper has the highest compression characteristic.

The front adjuster 162A includes a front adjustment member 164 in the form of a wedge. The front adjuster 162A further includes a front user input 168 that moves the front adjustment member 164 to change the compression characteristic of the front portion 44a of the ski stopper 44. The front adjuster 162A further includes a front support 172 for supporting the front adjustment member 164 and the front user input 168. Here, the front user input 168 includes a front knob 176 and a front adjustment screw 178 that is coupled to the front knob 176 so that the front knob 176 and the front adjustment screw 178 move together as a unit. The front support 172 supports the front knob 176 and the front adjustment screw 178. The front support 172 is fastened to the ski body 42 via the attachment bolts 48b of the wear bar 48 and the nuts 60 as seen in FIGS. 18 and 19.

The front adjustment screw 178 is threadedly engaged with a threaded hole of a jam nut 164a provided on the front adjustment member 164. The jam nut 164a locks the front adjustment member 164 (the front wedge) in place after being adjusted. In particular, the front adjustment member 164 (the front wedge) slides with respect to the ski body 42 and the front portion 44a of the ski stopper 44 in response to operation of the front user input 168 to change the compression characteristic of the front portion 44a of the ski stopper 44. The front adjustment member 164 (the front wedge) slides underneath the front portion 44a of the ski stopper 44 as the front knob 176 is rotated. If the front knob 176 is rotated so that the front adjustment member 164 (the front wedge) advances further beneath the front portion 44a of the ski stopper 44, the front portion 44a of the ski stopper 44 pushed towards the lower end 40c of the ski spindle 40. On the other hand, if the front knob 176 is rotated so that the front adjustment member 164 (the front wedge) retracted from beneath the front portion 44a of the ski stopper 44, the front portion 44a of the ski stopper 44 expends downwardly towards the ski body 42. In this way, the compression characteristic of the ski stopper 44 is infinitely adjustable by the user without disassembling any parts.

Similarly, the rear adjuster 162B includes a rear adjustment member 166 in the form of a wedge. The rear adjuster 162B further includes a rear user input 170 that moves the rear adjustment member 166 to change the compression characteristic of the rear portion 44b of the ski stopper 44. The rear adjuster 162B further includes a rear support 174 for supporting the rear adjustment member 166 and the rear user input 170 as seen in FIGS. 18 and 19. Here, the rear user input 170 includes a rear knob 186 and a rear adjustment screw 188 that is coupled to the rear knob 186 so that the rear knob 186 and the rear adjustment screw 188 move together as a unit. The rear support 174 supports the front knob 176 and the front adjustment screw 178. The rear support 174 is fastened to the ski body 42 via the attachment bolts 48b of the wear bar 48 and the nuts 60.

The rear adjustment screw 188 is threadedly engaged with a threaded hole of a jam nut 166a provided on the rear adjustment member 166. The jam nut 166a locks the rear adjustment member 166 (the rear wedge) in place after being adjusted. In particular, the rear adjustment member 166 (the rear wedge) slides with respect to the ski body 42 and the rear portion 44b of the ski stopper 44 in response to operation of the rear user input 170 to change the compression characteristic of the rear portion 44b of the ski stopper 44. The rear adjustment member 166 (the rear wedge) slides underneath the rear portion 44b of the ski stopper 44 as the rear knob 186 is rotated. If the rear knob 186 is rotated so that the rear adjustment member 166 (the rear wedge) advances further beneath the rear portion 44b of the ski stopper 44, the rear portion 44b of the ski stopper 44 pushed towards the lower end 40c of the ski spindle 40. On the other hand, if the rear knob 186 is rotated so that the rear adjustment member 166 (the rear wedge) retracted from beneath the rear portion 44b of the ski stopper 44, the rear portion 44b of the ski stopper 44 expends downwardly towards the ski body 42. In this way, the compression characteristic of the ski stopper 44 is infinitely adjustable by the user without disassembling any parts.

Referring now to FIGS. 20 to 24, a snow ski assembly 216 is illustrated in accordance with a third embodiment for use with the snowmobile 10. The snow ski assembly 216 is identical to the snow ski assembly 16, as discussed above, except that the front adjuster 62A and the rear adjuster 62B have been replaced with a front adjuster 262A and a rear adjuster 262B in the snow ski assembly 216. Thus, the parts of the snow ski assembly 216 that are identical to those parts of the snow ski assembly 16 will be given the same reference symbol, their descriptions will not be repeated for the sake of brevity.

Similar to the prior embodiments, the front adjuster 262A and the rear adjuster 262B are designed to provide quick and easy adjustability to the handling of the snowmobile 10 (e.g., the snow vehicle). With the front adjuster 262A and the rear adjuster 262B, the user can customize the feel and performance of the snow ski assembly 216 to meet the riding conditions as they change and to match the user's preference based on the user's riding style. In particular, the front adjuster 262A and the rear adjuster 262B are configured to change a compression characteristic of the ski stopper 44 without detaching the ski body 42 from the ski spindle 40.

The front adjuster 262A and the rear adjuster 262B are each examples of an adjusting means for changing a compression characteristic of the ski stopper 44 without detaching the ski body 42 from the ski spindle 40. The adjusting means can be defined only the front adjuster 262A, or only the rear adjuster 262B, or both. In other words, the adjusting means can carry out the function of changing a compression characteristic of the ski stopper 44 by changing only the front portion 44a of the ski stopper 44 or changing only the rear portion 44b of the ski stopper 44, or both.

The front adjuster 262A includes a front adjustment member 264 in the form of a lever. The front adjuster 262A further includes a front user input 268 that moves the front adjustment member 264 to change the compression characteristic of the front portion 44a of the ski stopper 44. The front adjuster 262A further includes a front housing 272 for supporting the front adjustment member 264 and the front user input 268. Here, the front user input 268 includes a front cam 276 and a front control pin 278 that is coupled to the front cam 276 so that movement of the front cam 276 is controlled by the front control pin 278 engaging a pair of slots 272a (only one slot shown in FIGS. 23 and 24) in the front housing 272. The front housing 272 supports the front cam 276 via the front control pin 278. The front housing 272 is fastened to the ski body 42 via the attachment bolts 48b of the wear bar 48 and the nuts 60.

The front adjustment member 264 (the front lever) is pivotally coupled to the front cam 276 so that the front adjustment member 264 moves with respect to the ski body 42 in response to operation of the front user input 268 to change the compression characteristic of the front portion 44a of the ski stopper 44. In this way, the front cam 276 is operatively coupled to the front adjustment member 264 (the front lever). The front adjustment member 264 (the front lever) contacts the front portion 44a of the ski stopper 44 as the front cam 276 is rotated about the front control pin 278. Based on the rotational position of the front cam 276, the compression characteristic of the ski stopper 44 can be adjusted by the user. The front cam 276 provides infinite adjustability without disassembling any parts. In this way, the front cam 276 is movably arranged relative to the ski body 42 such that the front cam 276 moves the front adjustment member 264 (the front lever) with respect to the ski body 42 between the plurality of positions in response to operation of the front user input 268.

Similarly, the rear adjuster 262B includes a rear adjustment member 266 in the form of a lever. The rear adjuster 262B further includes a rear user input 270 that moves the rear adjustment member 266 to change the compression characteristic of the rear portion 44b of the ski stopper 44. The rear adjuster 262B further includes a rear housing 274 for supporting the rear adjustment member 266 and the rear user input 270. Here, the rear user input 270 includes a rear cam 286 and a rear control pin 288 that is coupled to the rear cam 286 so that movement of the rear cam 286 is controlled by the rear control pin 288 engaging a pair of slots 274a (only one slot shown in FIGS. 23 and 24) in the rear housing 274. The rear housing 274 supports the rear cam 286 via the rear control pin 288. The rear housing 274 is fastened to the ski body 42 via the attachment bolts 48b of the wear bar 48 and the nuts 60.

The rear adjustment member 266 (the rear lever) is pivotally coupled to the rear cam 286 so that the rear adjustment member 266 moves with respect to the ski body 42 in response to operation of the rear user input 270 to change the compression characteristic of the rear portion 44b of the ski stopper 44. In this way, the rear cam 286 is operatively coupled to the rear adjustment member 266 (the rear lever). The rear adjustment member 266 (the rear lever) contacts the rear portion 44b of the ski stopper 44 as the rear cam 286 is rotated about the rear control pin 288. Based on the rotational position of the rear cam 286, the compression characteristic of the ski stopper 44 can be adjusted by the user. The rear cam 286 provides infinite adjustability without disassembling any parts. In this way, the rear cam 286 is movably arranged relative to the ski body 42 such that the rear cam 286 moves the rear adjustment member 266 (the rear lever) with respect to the ski body 42 between the plurality of positions in response to operation of the rear user input 270.

Referring now to FIGS. 25 to 28, a portion of a snow ski assembly 316 is illustrated in accordance with a fourth embodiment for use with the snowmobile 10. The snow ski assembly 316 is identical to the snow ski assembly 16, as discussed above, except that the front adjuster 62A and the rear adjuster 62B have been replaced with a front adjuster 362A and a rear adjuster 362B in the snow ski assembly 316. Thus, the parts of the snow ski assembly 316 that are identical to those parts of the snow ski assembly 16 will be given the same reference symbol, their descriptions will not be repeated for the sake of brevity.

Similar to the prior embodiments, the front adjuster 362A and the rear adjuster 362B are designed to provide quick and easy adjustability to the handling of the snowmobile 10 (e.g., the snow vehicle). With the front adjuster 362A and the rear adjuster 362B, the user can customize the feel and performance of the snow ski assembly 316 to meet the riding conditions as they change and to match the user's preference based on the user's riding style. In particular, the front adjuster 362A and the rear adjuster 362B are configured to change a compression characteristic of the ski stopper 44 without detaching the ski body 42 from the ski spindle 40.

The front adjuster 362A and the rear adjuster 362B are each examples of an adjusting means for changing a compression characteristic of the ski stopper 44 without detaching the ski body 42 from the ski spindle 40. The adjusting means can be defined only the front adjuster 362A, or only the rear adjuster 362B, or both. In other words, the adjusting means can carry out the function of changing a compression characteristic of the ski stopper 44 by changing only the compression characteristic of the front portion 44a of the ski stopper 44 or changing only the compression characteristic of the rear portion 44b of the ski stopper 44, or both.

The front adjuster 362A includes a front adjustment member 364 in the form of an inflatable member. The front adjuster 362A further includes a front user input 368 that moves the front adjustment member 364 to change the compression characteristic of the front portion 44a of the ski stopper 44. Here, the front user input 368 includes an inflator pump 376 and a pressure release valve 378. While one example of an inflator pump is illustrated, it will be apparent from this disclosure that other types of air inflation methods or pumps can be used such as a standard bicycle hand pump that can be attached to a conventional air valve to expand or inflate the front adjustment member 364 (the inflatable member). Basically, the front adjustment member 364 is an air shim that is configured to expand or inflate by a user squeezing the inflator pump 376 and contract or deflate by a user operating the pressure release valve 378. The pressure release valve 378 is a one-way valve that allows air to enter an internal cavity of the front adjustment member 364 (the inflatable member), but not exit the internal cavity of the front adjustment member 364 when the pressure release valve 378 is in a filling position. However, when the pressure release valve 378 is in a release position, the air can be freely released from the internal cavity of the front adjustment member 364 (the inflatable member).

The rear adjuster 362B includes a rear adjustment member 366 in the form of an inflatable member. The rear adjuster 362B further includes a rear user input 370 that moves the rear adjustment member 366 to change the compression characteristic of the rear portion 44b of the ski stopper 44. Here, the rear user input 370 includes an inflator pump 386 and a pressure release valve 388. While one example of an inflator pump is illustrated, it will be apparent from this disclosure that other types of air inflation methods or pumps can be used such as a standard bicycle hand pump that can be attached to a conventional air valve to expand or inflate the rear adjustment member 366 (the inflatable member). Basically, the rear adjustment member 366 is an air shim that is configured to expand or inflate by a user squeezing the inflator pump 386 and contract or deflate by a user operating the pressure release valve 388. The pressure release valve 388 is a one-way valve that allows air to enter an internal cavity of the rear adjustment member 366 (the inflatable member), but not exit the internal cavity of the rear adjustment member 366 when the pressure release valve 388 is in a filling position. However, when the pressure release valve 388 is in a release position, the air can be freely released from the internal cavity of the rear adjustment member 366 (the inflatable member).

Figure 29:
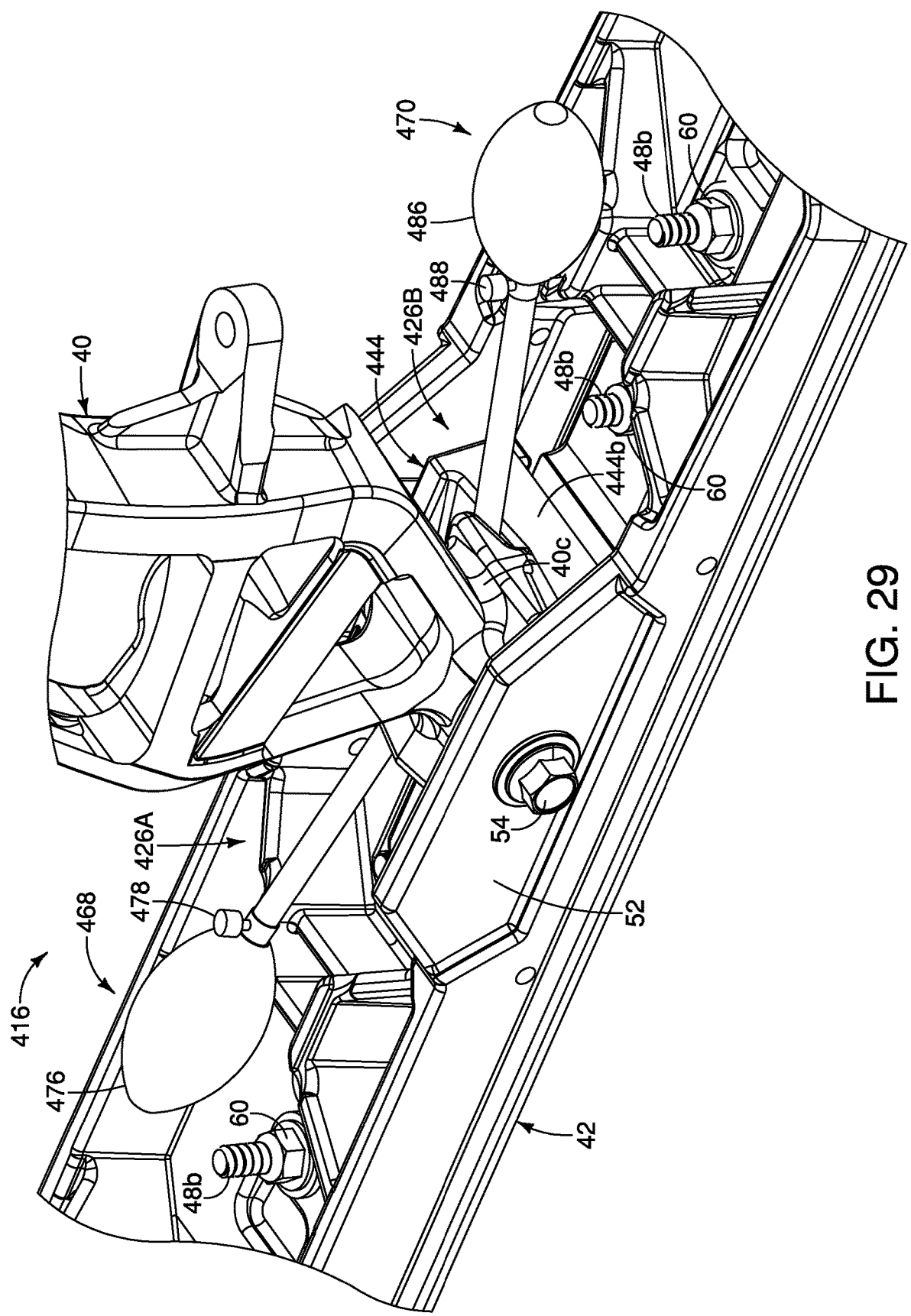
FIG. 29 is an enlarged perspective view of a portion of a snow ski assembly in accordance with a fifth embodiment.
Figure 30:
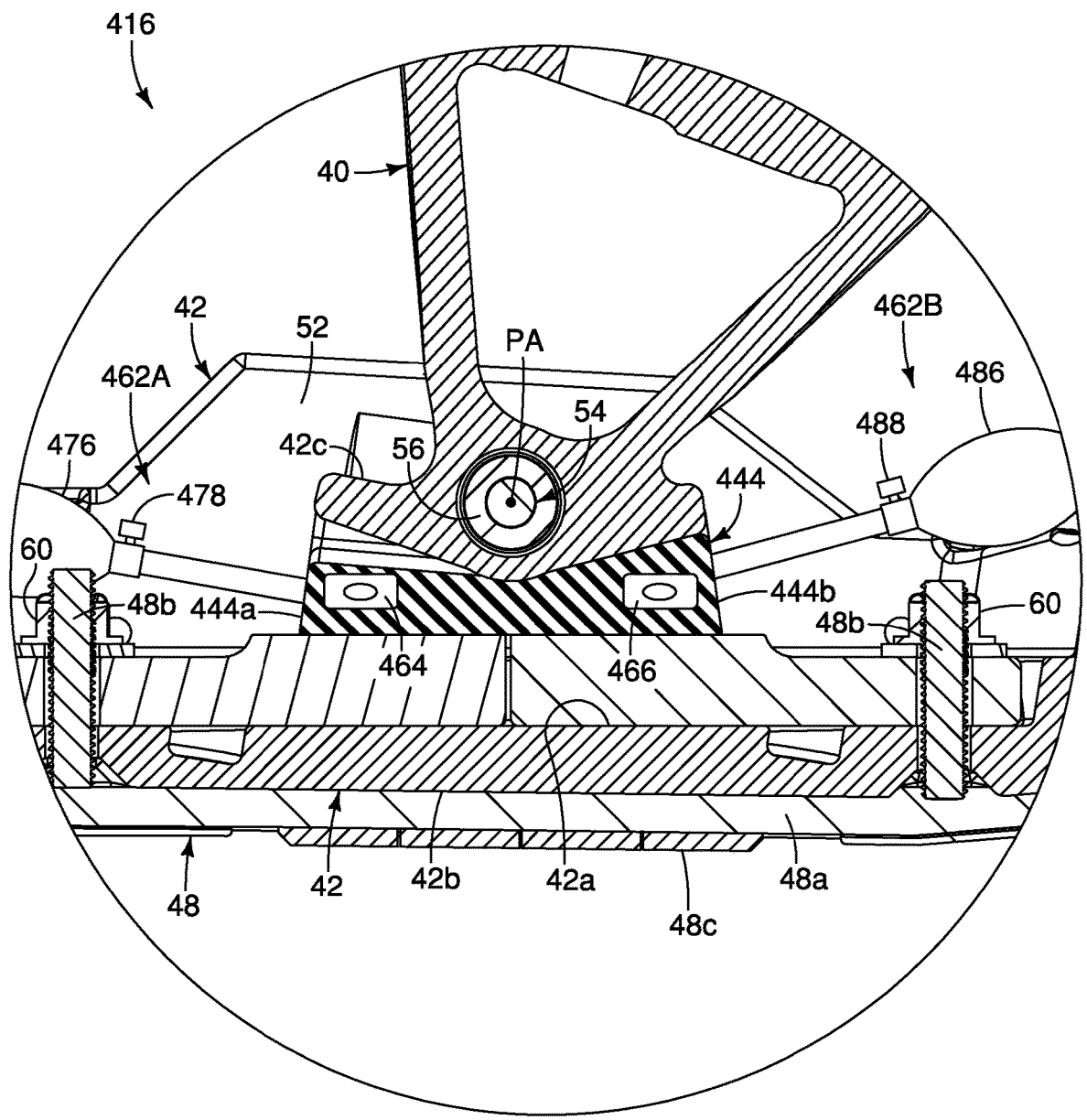
FIG. 30 is an enlarged cross-sectional view of a portion of the snow ski assembly illustrated in FIG. 29 in which the adjustment members are set so that the ski stopper has the lowest compression characteristic.
Figure 31:
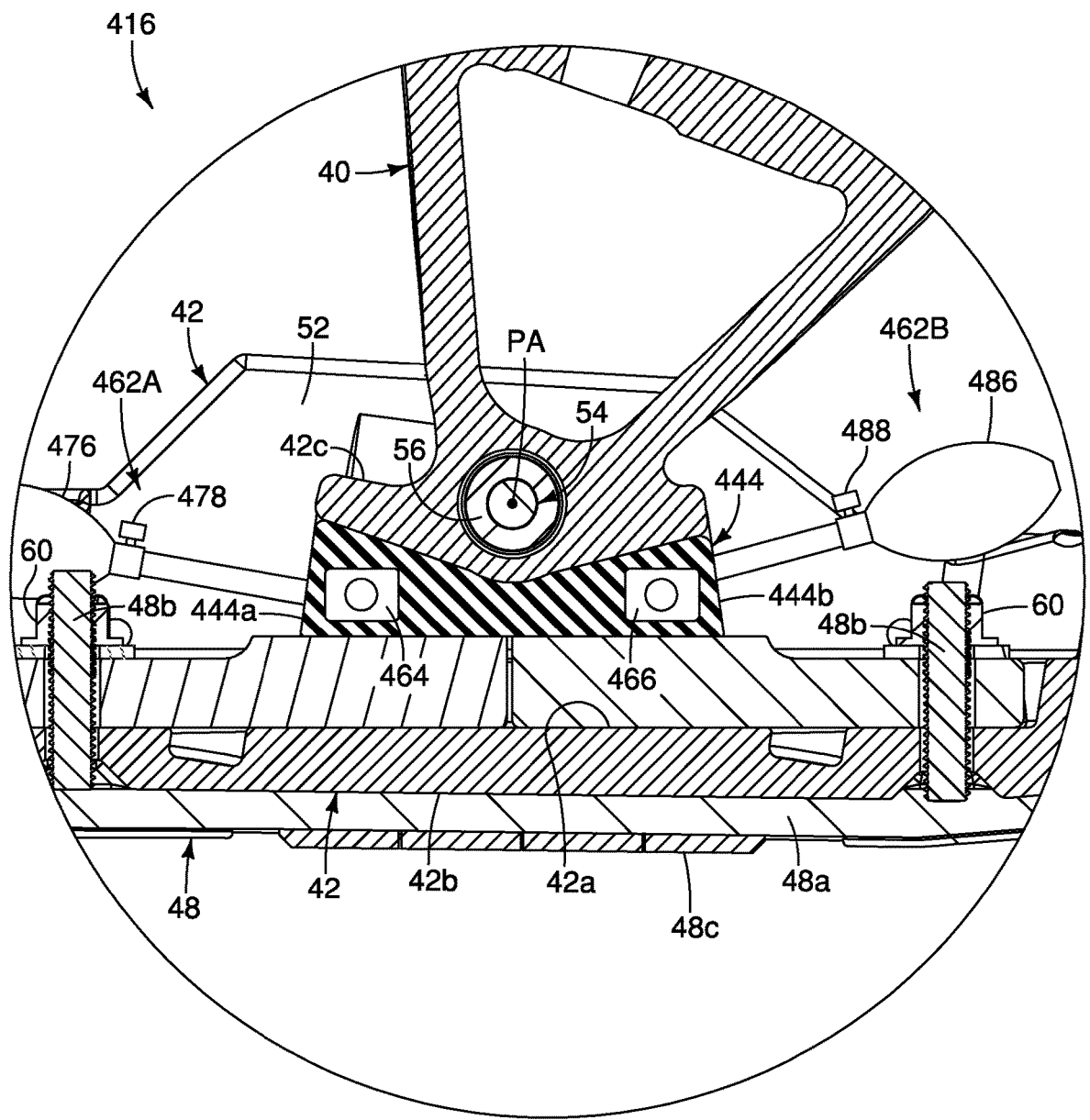
FIG. 31 is an enlarged cross-sectional view of a portion of the snow ski assembly illustrated in FIG. 29 but in which the adjustment members are set so that the ski stopper has the highest compression characteristic.

Referring now to FIGS. 29 to 31, a portion of a snow ski assembly 416 is illustrated in accordance with a fifth embodiment for use with the snowmobile 10. The snow ski assembly 416 is identical to the snow ski assembly 16, as discussed above, except that the front adjuster 62A and the rear adjuster 62B have been replaced with a front adjuster 462A and a rear adjuster 462B in the snow ski assembly 416. Thus, the parts of the snow ski assembly 416 that are identical to those parts of the snow ski assembly 16 will be given the same reference symbol, their descriptions will not be repeated for the sake of brevity.

Similar to the prior embodiments, the front adjuster 462A and the rear adjuster 462B are designed to provide quick and easy adjustability to the handling of the snowmobile 10 (e.g., the snow vehicle). With the front adjuster 462A and the rear adjuster 462B, the user can customize the feel and performance of the snow ski assembly 416 to meet the riding conditions as they change and to match the user's preference based on the user's riding style. In particular, the front adjuster 462A and the rear adjuster 462B are configured to change a compression characteristic of the ski stopper 444 without detaching the ski body 42 from the ski spindle 40.

The front adjuster 462A and the rear adjuster 462B are each examples of an adjusting means for changing a compression characteristic of the ski stopper 444 without detaching the ski body 42 from the ski spindle 40. The adjusting means can be defined only the front adjuster 462A, or only the rear adjuster 462B, or both. In other words, the adjusting means can carry out the function of changing a compression characteristic of the ski stopper 444 by changing only the compression characteristic of the front portion 444a of the ski stopper 444 or changing only the compression characteristic of the rear portion 444b of the ski stopper 444, or both.

The front adjuster 462A includes a front adjustment member 464 in the form of an inflatable member that is disposed in interior area of the front portion 444a of the ski stopper 444. The front adjuster 462A further includes a front user input 468 that moves (inflates or deflates) the front adjustment member 464 to change the compression characteristic of the front portion 444a of the ski stopper 444. Here, the front user input 468 includes an inflator pump 476 and a pressure release valve 478. While one example of an inflator pump is illustrated, it will be apparent from this disclosure that other types of air inflation methods or pumps can be used such as a standard bicycle hand pump that can be attached to a conventional air valve to expand or inflate the front adjustment member 464 (the inflatable member). Basically, the front adjustment member 464 (the inflatable member) is an air bladder that is configured to expand or inflate by a user squeezing the inflator pump 476 and contract or deflate by a user operating the pressure release valve 478. The pressure release valve 478 is a one-way valve that allows air to enter an internal cavity of the front adjustment member 464 (the inflatable member), but not exit the internal cavity of the front adjustment member 464 when the pressure release valve 478 is in a filling position. However, when the pressure release valve 478 is in a release position, the air can be freely released from the internal cavity of the front adjustment member 464 (the inflatable member). The front adjustment member 464 (the inflatable member) can be formed by the ski stopper 444 (bladderless) or can be an inflatable bladder that located in a cavity of the ski stopper 444.

The rear adjuster 462B includes a rear adjustment member 466 in the form of an inflatable member that is disposed in interior area of the rear portion 444b of the ski stopper 444. The rear adjuster 462B further includes a rear user input 470 that moves (inflates or deflates) the rear adjustment member 466 to change the compression characteristic of the rear portion 444b of the ski stopper 444. Here, the rear user input 470 includes an inflator pump 486 and a pressure release valve 488. While one example of an inflator pump is illustrated, it will be apparent from this disclosure that other types of air inflation methods or pumps can be used such as a standard bicycle hand pump that can be attached to a conventional air valve to expand or inflate the rear adjustment member 466 (the inflatable member). Basically, the rear adjustment member 466 (the inflatable member) is an air bladder that is configured to expand or inflate by a user squeezing the inflator pump 486 and contract or deflate by a user operating the pressure release valve 488. The pressure release valve 488 is a one-way valve that allows air to enter an internal cavity of the rear adjustment member 466 (the inflatable member), but not exit the internal cavity of the rear adjustment member 466 when the pressure release valve 488 is in a filling position. However, when the pressure release valve 488 is in a release position, the air can be freely released from the internal cavity of the rear adjustment member 466 (the inflatable member). The rear adjustment member 466 (the inflatable member) can be formed by the ski stopper 444 (bladderless) or can be an inflatable bladder that located in a cavity of the ski stopper 444.

Figure 32:
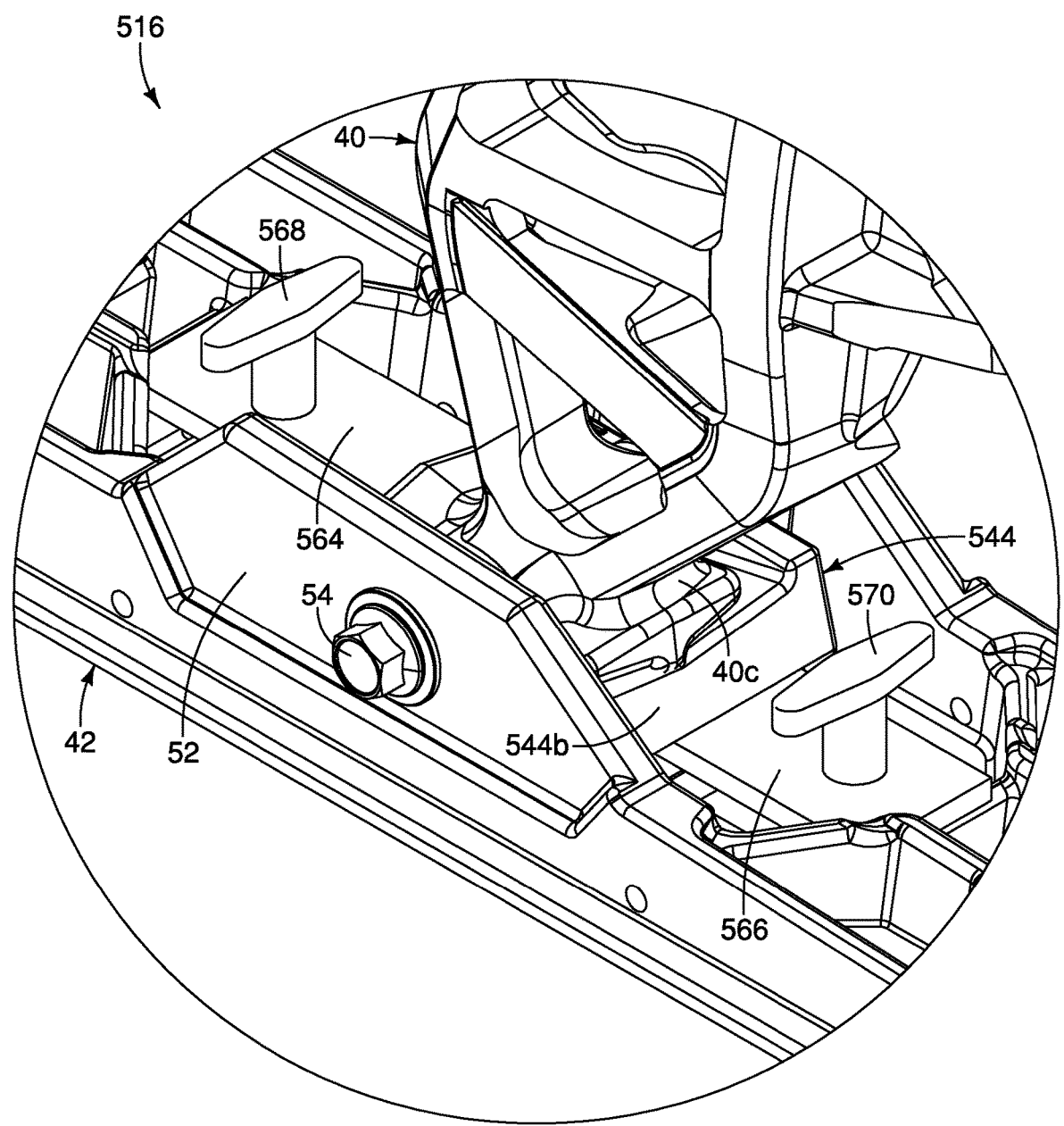
FIG. 32 is an enlarged perspective view of a portion of a snow ski assembly in accordance with a sixth embodiment.
Figure 33:
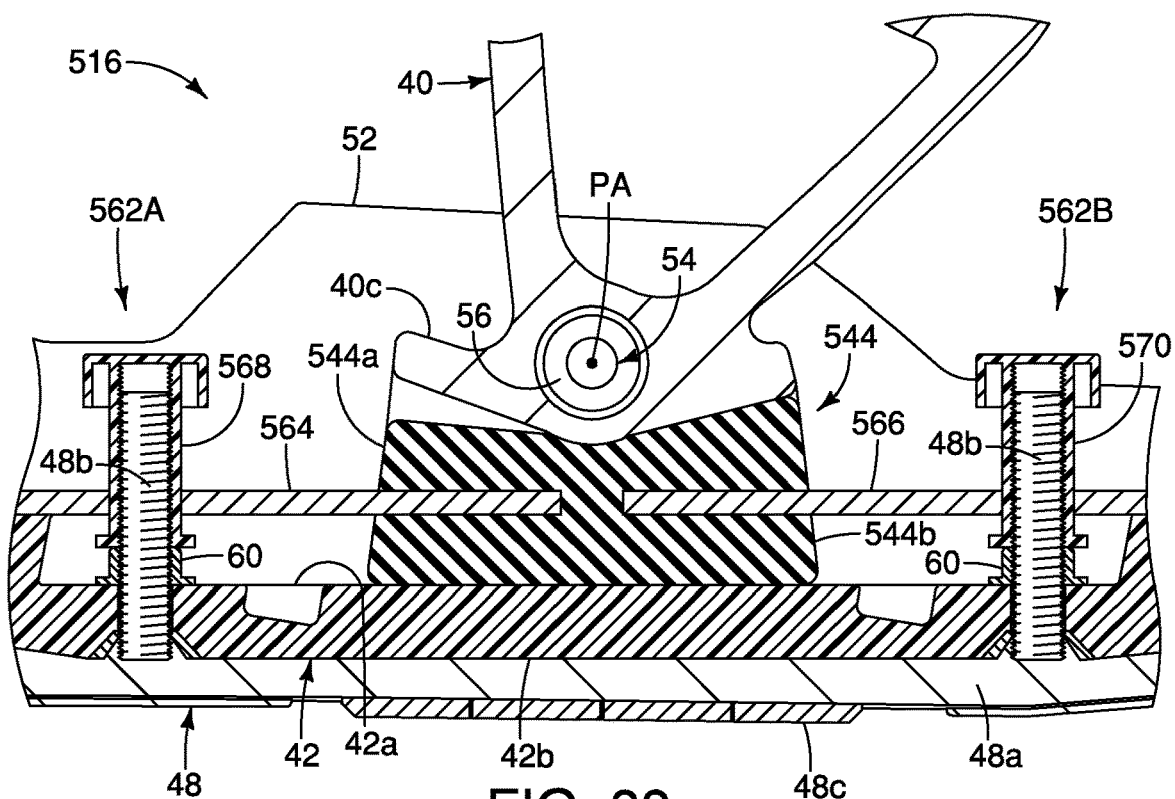
FIG. 33 is an enlarged cross-sectional view of a portion of the snow ski assembly illustrated in FIG. 32 in which the adjustment members are set so that the ski stopper has the lowest compression characteristic.
Figure 34:
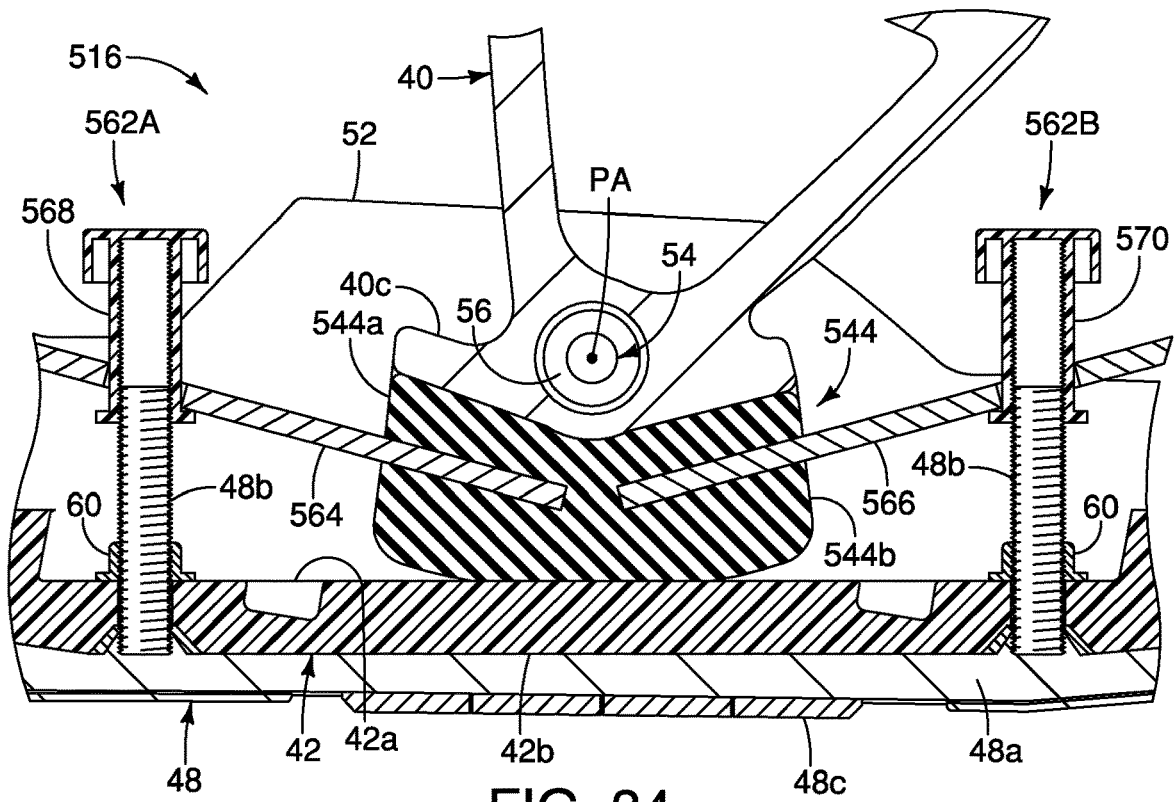
FIG. 34 is an enlarged cross-sectional view of a portion of the snow ski assembly illustrated in FIG. 32 but in which the adjustment members are set so that the ski stopper has the highest compression characteristic.

Referring now to FIGS. 32 to 34, a portion of a snow ski assembly 516 is illustrated in accordance with a sixth embodiment for use with the snowmobile 10. The snow ski assembly 516 is identical to the snow ski assembly 16, as discussed above, except that the front adjuster 62A and the rear adjuster 62B have been replaced with a front adjuster 562A and a rear adjuster 562B in the snow ski assembly 516. Thus, the parts of the snow ski assembly 516 that are identical to those parts of the snow ski assembly 16 will be given the same reference symbol, their descriptions will not be repeated for the sake of brevity.

Similar to the prior embodiments, the front adjuster 562A and the rear adjuster 562B are designed to provide quick and easy adjustability to the handling of the snowmobile 10 (e.g., the snow vehicle). With the front adjuster 562A and the rear adjuster 562B, the user can customize the feel and performance of the snow ski assembly 516 to meet the riding conditions as they change and to match the user's preference based on the user's riding style. In particular, the front adjuster 562A and the rear adjuster 562B are configured to change a compression characteristic of a ski stopper 544 without detaching the ski body 42 from the ski spindle 40.

The front adjuster 562A and the rear adjuster 562B are each examples of an adjusting means for changing a compression characteristic of the ski stopper 544 without detaching the ski body 42 from the ski spindle 40. The adjusting means can be defined only the front adjuster 562A, or only the rear adjuster 562B, or both. In other words, the adjusting means can carry out the function of changing a compression characteristic of the ski stopper 544 by changing only the compression characteristic of a front portion 544a of the ski stopper 544 or changing only the compression characteristic of a rear portion 544b of the ski stopper 544, or both.

The front adjuster 562A includes a front adjustment member 564 in the form of a front lever. The front adjuster 562A further includes a front user input 568 that moves the front adjustment member 564 to change the compression characteristic of the front portion 544a of the ski stopper 544. Here, the front user input 568 is a front knob that is screwed onto one of the bolts 48b of the wear bar 48. Basically, the front adjustment member 564 (the front lever) has a first end 564a that is embedded in the front portion 544a of the ski stopper 544 and a second end 564b that is coupled to the front user input 568 (the front knob). In this way, the second end 564b of the front adjustment member 564 (the front lever) is moved up or down the bolt 48b of the wear bar 48 as the front user input 568 (the front knob) is turned by a user. Thus, the front portion 544a of the ski stopper 544 is moved towards or way from the lower end 40c of the ski spindle 40 as the front user input 568 (the front knob) is turned by a user.

The rear adjuster 562B includes a rear adjustment member 566 in the form of a rear lever. The rear adjuster 562B further includes a rear user input 570 that moves the rear adjustment member 566 to change the compression characteristic of the rear portion 544b of the ski stopper 544. Here, the rear user input 570 is a rear knob that is screwed onto one of the bolts 48b of the wear bar 48. Basically, the rear adjustment member 566 (the lever) has a first end 566a that is embedded in the rear portion 544b of the ski stopper 544 and a second end 566b that is coupled to the front user input 568 (the rear knob). In this way, the second end 566b of the rear adjustment member 566 (the rear lever) is moved up or down the bolt 48b of the wear bar 48 as the rear user input 570 is turned by a user. Thus, the rear portion 544b of the ski stopper 544 is moved towards or way from the lower end 40c of the ski spindle 40 as the front user input 568 (the rear knob) is turned by a user.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Thus, as used herein, the singular forms "a," "an" and "the" are intended to include the plural forms as well, unless the context clearly indicates otherwise. Also, the terms "part," "section," "portion," "member" or "element" when used in the singular can have the dual meaning of a single part or a plurality of parts. Unless otherwise defined, all terms (including technical and scientific terms) used herein have the same meaning as commonly understood by one of ordinary skill in the art to which illustrative embodiments of the inventive concepts belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein the term "and/or" includes any and all combinations of one or more of the associated listed items. Additionally, similar words used to describe the relationship between elements or layers should be interpreted in a like fashion (e.g., "between" versus "directly between", "above" versus "directly above", "below" versus "directly below", "adjacent" versus "directly adjacent," "on" versus "directly on"). Thus, components that are shown directly connected or contacting each other can have intermediate structures disposed between them unless specified otherwise.

The phrase "at least one of" as used in this disclosure means "one or more" of a desired choice. For one example, the phrase "at least one of" as used in this disclosure means "only one single choice" or "both of two choices" if the number of its choices is two. For another example, the phrase "at least one of" as used in this disclosure means "only one single choice" or "any combination of equal to or more than two choices" if the number of its choices is equal to or more than three.

Also, it will be understood that, although the terms "first", "second", etc. may be used herein to describe various elements, components, regions, positions and/or sections, these elements, components, regions, positions and/or sections should not be limited by these terms. These terms are only used to distinguish one element, component, region, layer, position or section from another element, component, region, layer, position or section. Thus, a first element, component, region, position or section discussed above could be termed a second element, component, region, position or section without departing from the teachings of illustrative embodiments.

Spatially relative terms, such as "forward", "rearward", "above", "below", "beneath", "downward", "vertical", "horizontal", and "transverse" as well as any other similar spatial terms may be used herein for the ease of description to describe one element or feature's relationship to another element(s) or feature(s) of the above embodiments. These terms, as utilized to describe the present invention should be interpreted relative to a snow vehicle on a flat horizontal surface and with to a direction in which a rider looks straight when seated on a rider's seat in a straight forward driving direction. Thus, front, rear, left and right shown in the description of the preferred embodiments indicate the front, rear, left and right, respectively, when viewed from a vehicle occupant seated on a seat. The terms of degree such as "substantially", "about" and "approximately" as used herein mean an amount of deviation of the modified term such that the end result is not significantly changed.

While only selected embodiments have been chosen to illustrate the present invention, it will be apparent to those skilled in this field from this disclosure that various changes and modifications can be made herein without departing from the scope of the invention as defined in the appended claims. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A snow ski assembly for a snow vehicle, the snow ski assembly comprising:
a ski body having an upper surface with a ski spindle attachment and a bottom surface with a keel;
a ski spindle having a lower end pivotally connected to the ski spindle attachment of the ski body about a pivot axis;
a ski stopper disposed between the upper surface of the ski body and the lower end of the ski spindle; and
a ski keel pressure adjuster including
at least one adjustment member movably disposed with respect to the ski body between a first position in which the ski stopper has a first compression characteristic and a second position in which the ski stopper has a second compression characteristic, and
at least one user input operatively coupled to the at least one adjustment member to move the at least one adjustment member in response to operation of the at least one user input.

2. The snow ski assembly according to claim 1, wherein the ski stopper includes a front portion located forward of the pivot axis and a rear portion located rearward of the pivot axis, and
the at least one adjustment member includes a front adjustment member that is arranged to selectively compress the front portion as the front adjustment member moves from the first position to the second position.

3. The snow ski assembly according to claim 1, wherein the ski stopper includes a front portion located forward of the pivot axis and a rear portion located rearward of the pivot axis, and
the at least one adjustment member includes a rear adjustment member that is arranged to selectively compress the rear portion as the rear adjustment member moves from the first position to the second position.

4. The snow ski assembly according to claim 2, wherein the at least one adjustment member includes a rear adjustment member that is arranged to selectively compress the rear portion as the rear adjustment member moves from the first position to the second position.

5. The snow ski assembly according to claim 4, wherein the at least one user input includes a front user input operatively coupled to the front adjustment member, and a rear user input operatively coupled to the rear adjustment member.

6. The snow ski assembly according to claim 1, wherein the at least one user input includes a knob and an adjustment screw coupled to the knob, and
the at least one adjustment member is operatively coupled to the adjustment screw.

7. The snow ski assembly according to claim 1, wherein the at least one adjustment member is at least partially movable in a direction away from the ski body as the at least one adjustment member moves from the first position and the second position in response to operation of the at least one user input.

8. The snow ski assembly according to claim 1, wherein the at least one adjustment member has a first portion disposed between the ski stopper and the ski body and a second portion coupled to the at least one user input.

9. The snow ski assembly according to claim 1, wherein the at least one adjustment member is a wedge that slides with respect to the ski body between the first position and the second position in response to operation of the at least one user input.

10. The snow ski assembly according to claim 1, wherein the at least one user input includes a cam operatively coupled to the at least one adjustment member, the cam is movably arranged relative to the ski body such that the cam moves the at least one adjustment member with respect to the ski body between the first position and the second position in response to operation of the at least one user input.

11. The snow ski assembly according to claim 1, wherein the at least one adjustment member is an inflatable member.

12. The snow ski assembly according to claim 11, wherein the at least one user input includes an inflator pump and a pressure release valve.

13. The snow ski assembly according to claim 11, wherein the inflatable member is disposed between the ski stopper and the ski body.

14. The snow ski assembly according to claim 11, wherein the inflatable member is disposed in interior area of the ski stopper.

15. A snow ski assembly for a snow vehicle, the snow ski assembly comprising:
a ski body having an upper surface with a ski spindle attachment and a bottom surface with a keel;
a ski spindle having a lower end pivotally connected to the ski spindle attachment of the ski body about a pivot axis;
a ski stopper disposed between the upper surface of the ski body and the lower end of the ski spindle; and
a ski keel pressure adjuster including at least one adjustment member movably disposed with respect to the ski stopper between at least two positions and at least one user input operatively coupled to the at least one adjustment member to selectively establish the at least two positions without detaching the ski body from the ski spindle.

16. A snow ski assembly for a snow vehicle, the snow ski assembly comprising:
a ski body having an upper surface with a ski spindle attachment and a bottom surface with a keel;
a ski spindle having a lower end pivotally connected to the ski spindle attachment of the ski body about a pivot axis;

a ski stopper disposed between the upper surface of the ski body and the lower end of the ski spindle; and adjusting means for changing a ski keel pressure without detaching the ski body from the ski spindle.

* * * * *